US011498772B2

(12) United States Patent
Beyer et al.

(10) Patent No.: US 11,498,772 B2
(45) Date of Patent: Nov. 15, 2022

(54) METHOD AND DEVICE FOR BUFFERING CONTAINERS

(71) Applicant: KRONES AG, Neutraubling (DE)

(72) Inventors: Michael Beyer, Wenzenbach (DE); Stefan Elsperger, Soechtenau (DE); Konrad Senn, Alteglofsheim (DE); Helmut Schuesslburner, Straubing (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/353,579

(22) Filed: Jun. 21, 2021

(65) Prior Publication Data

US 2021/0395019 A1 Dec. 23, 2021

(30) Foreign Application Priority Data

Jun. 22, 2020 (DE) .......................... 102020207677.4

(51) Int. Cl.
*B65G 47/51* (2006.01)
*B67C 3/24* (2006.01)

(52) U.S. Cl.
CPC ...... *B65G 47/5131* (2013.01); *B65G 47/5113* (2013.01); *B67C 3/24* (2013.01); *B65G 2201/0235* (2013.01)

(58) Field of Classification Search
CPC ............ B65G 47/5131; B65G 47/5113; B65G 2201/0244; B65G 2201/0235
USPC .......................................... 198/347.1, 347.4
See application file for complete search history.

(56) References Cited

U.S. PATENT DOCUMENTS

| 4,635,784 | A | * | 1/1987 | Bourgeois | .......... | B65G 47/5109 |
| | | | | | | 198/429 |
| 6,609,605 | B1 | * | 8/2003 | Linder | ............... | B65G 47/5104 |
| | | | | | | 198/347.4 |
| 7,124,558 | B2 | * | 10/2006 | Weaver | ..................... | B65B 5/08 |
| | | | | | | 53/247 |
| 9,505,562 | B2 | * | 11/2016 | Petrovic | ................. | B65G 37/00 |
| 10,442,635 | B2 | * | 10/2019 | Gehin | .................. | B65G 47/845 |
| 2006/0070847 | A1 | * | 4/2006 | Besch | ................. | B65G 1/0492 |
| | | | | | | 198/347.4 |

(Continued)

FOREIGN PATENT DOCUMENTS

| DE | 102017103089 A1 | 8/2018 |
| DE | 102018211859 A1 | 1/2020 |

(Continued)

*Primary Examiner* — James R Bidwell
(74) *Attorney, Agent, or Firm* — McCoy Russell LLP

(57) ABSTRACT

A method and a device for buffering containers in a container treatment plant are disclosed. The containers are stored in single rows by at least one inlet conveyor belt in an inlet direction, are shifted in single rows on a buffer surface transversely adjacent by shuttles with row pushers guided on rails and driven individually into a buffer direction extending transversely to the inlet direction in single rows, and are withdrawn by at least one outlet conveyor belt adjacent to the buffer surface in the buffer direction in an outlet direction extending transversely to the buffer direction, or by at least one planar motor armature that can be driven towards the buffer surface and that is in particular driven two-dimensionally. Thus, the containers can be decelerated/accelerated with respect to the inlet/outlet conveyor belt in a controlled manner.

21 Claims, 17 Drawing Sheets

(56) References Cited

U.S. PATENT DOCUMENTS

2012/0219397 A1* 8/2012 Baker ............... B65G 1/1373
 414/796
2015/0291367 A1 10/2015 Petrovic
2019/0039835 A1 2/2019 Gehin et al.

FOREIGN PATENT DOCUMENTS

| EP | 3656707 A1 | 5/2020 |
| FR | 2847242 A1 | 5/2004 |
| FR | 3075768 A1 | 6/2019 |
| WO | 8404740 A1 | 12/1984 |
| WO | 2019228901 A1 | 12/2019 |
| WO | 2020035160 A1 | 2/2020 |

* cited by examiner

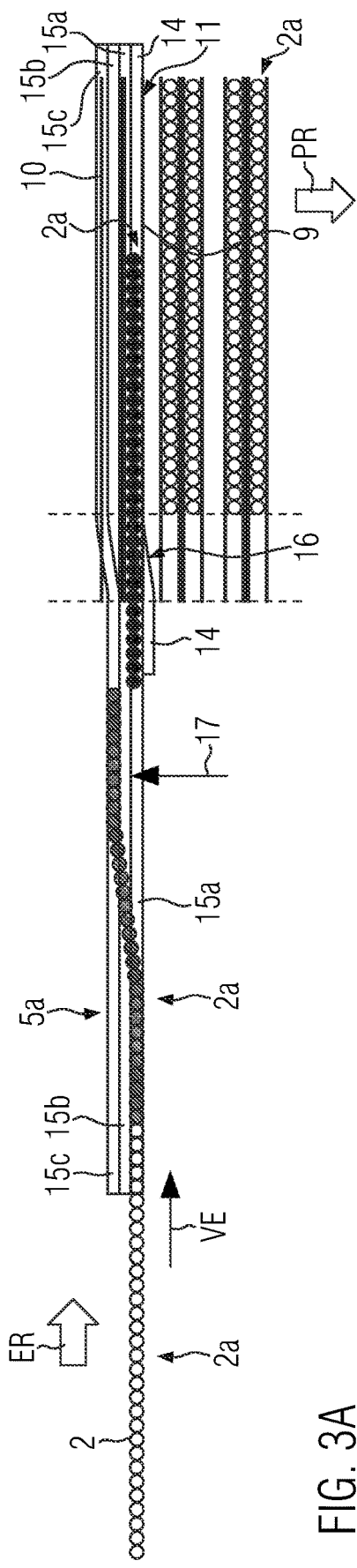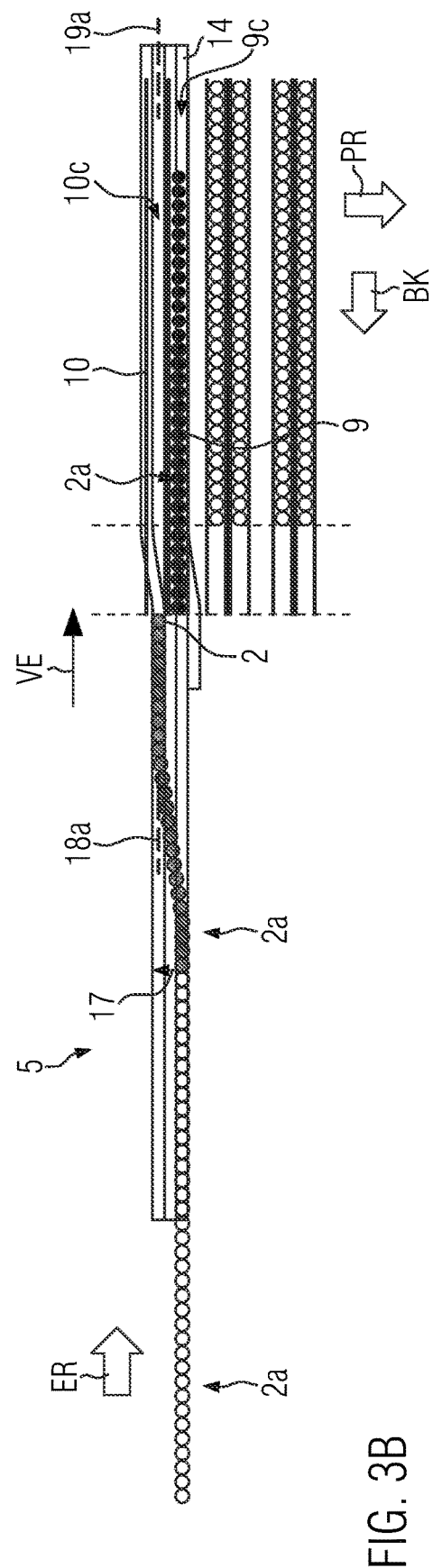

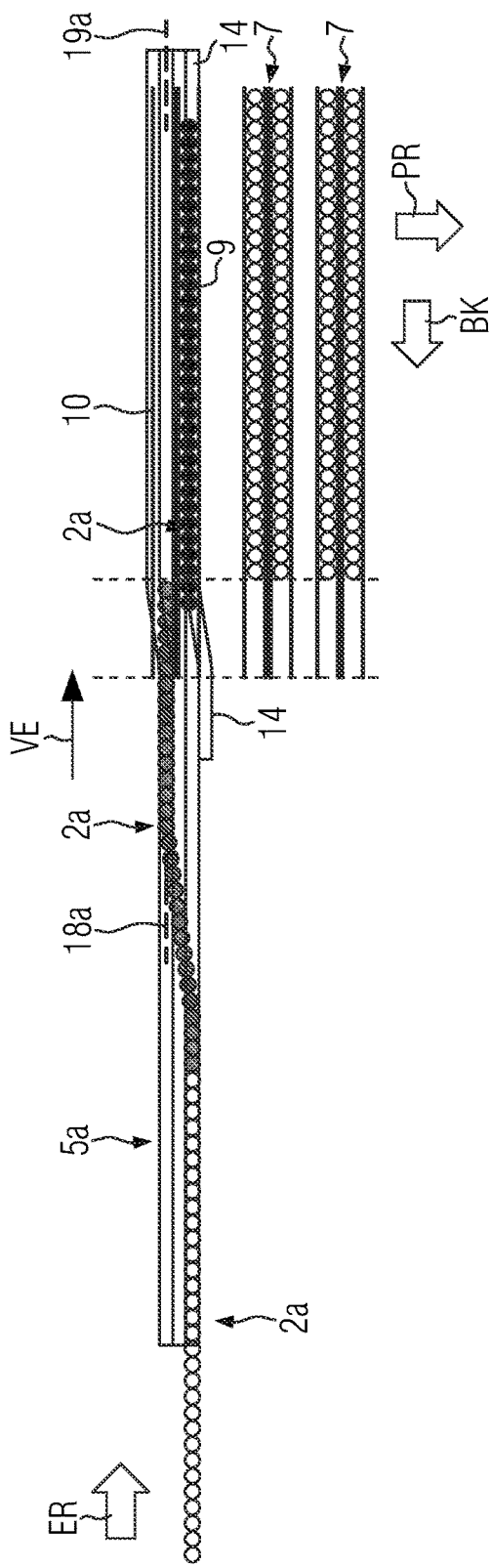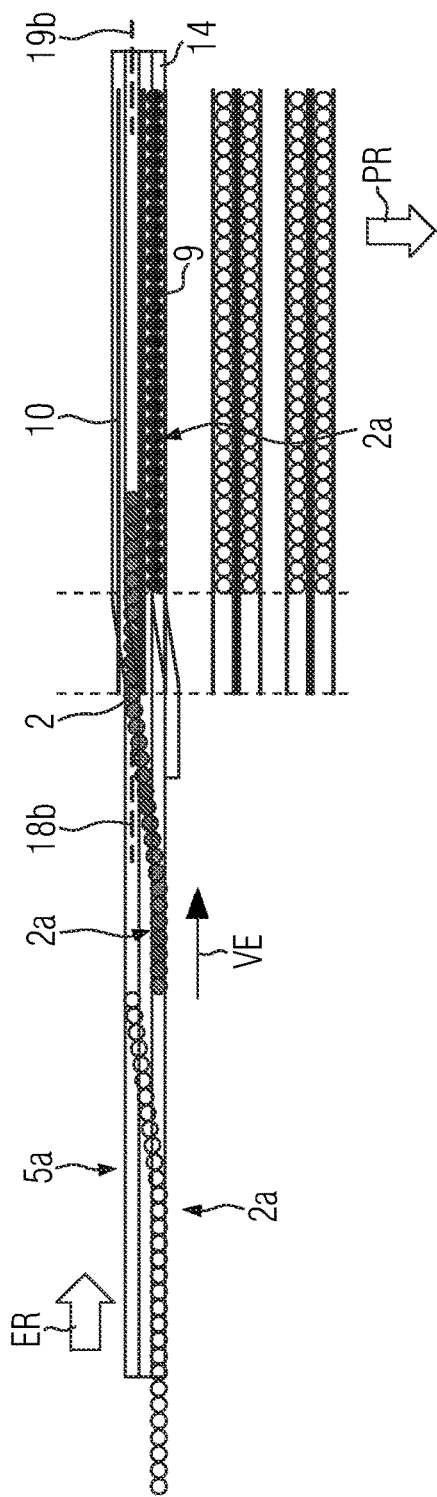

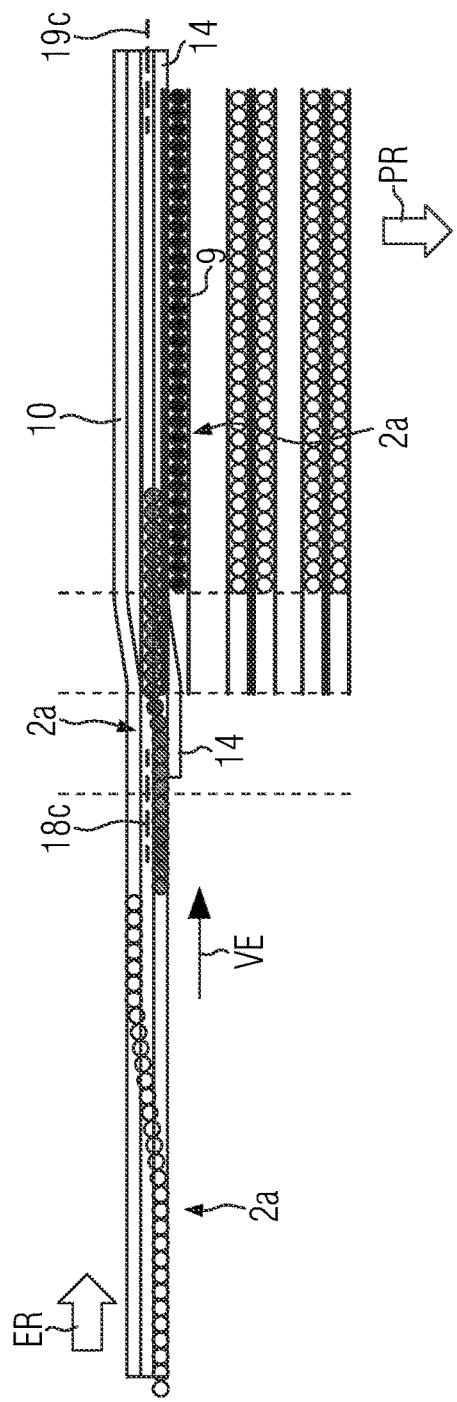
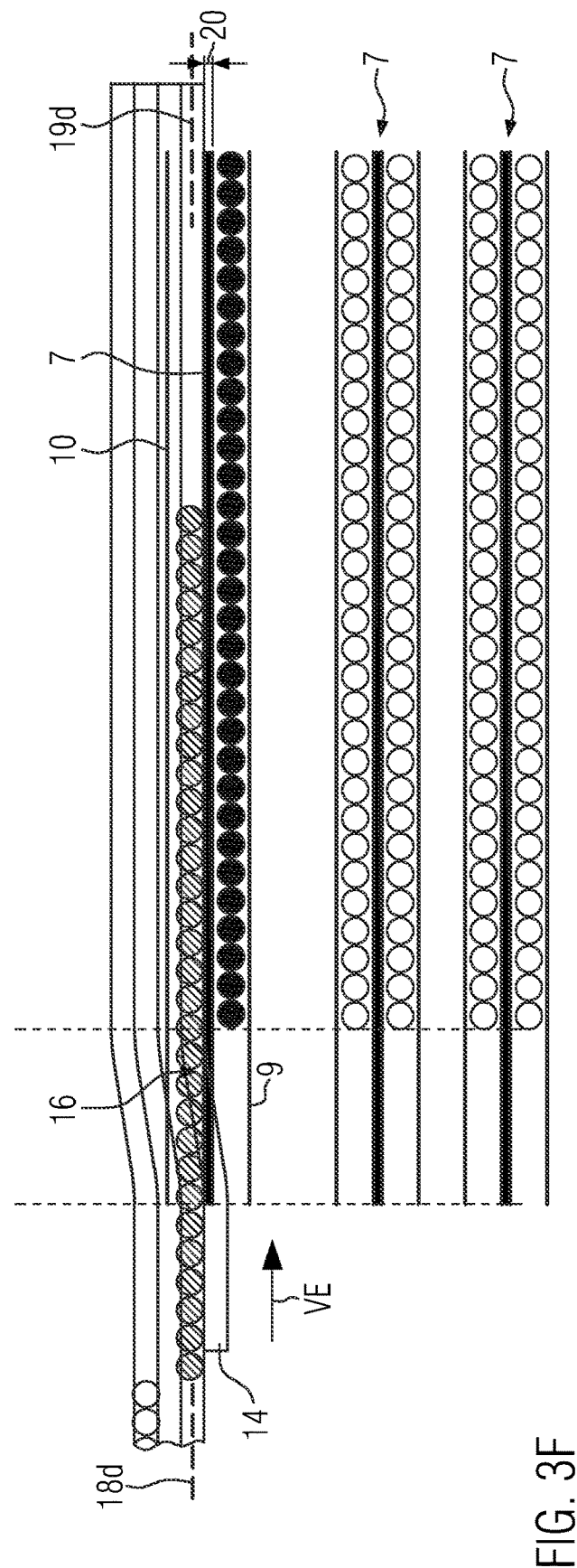
FIG. 3E
FIG. 3F

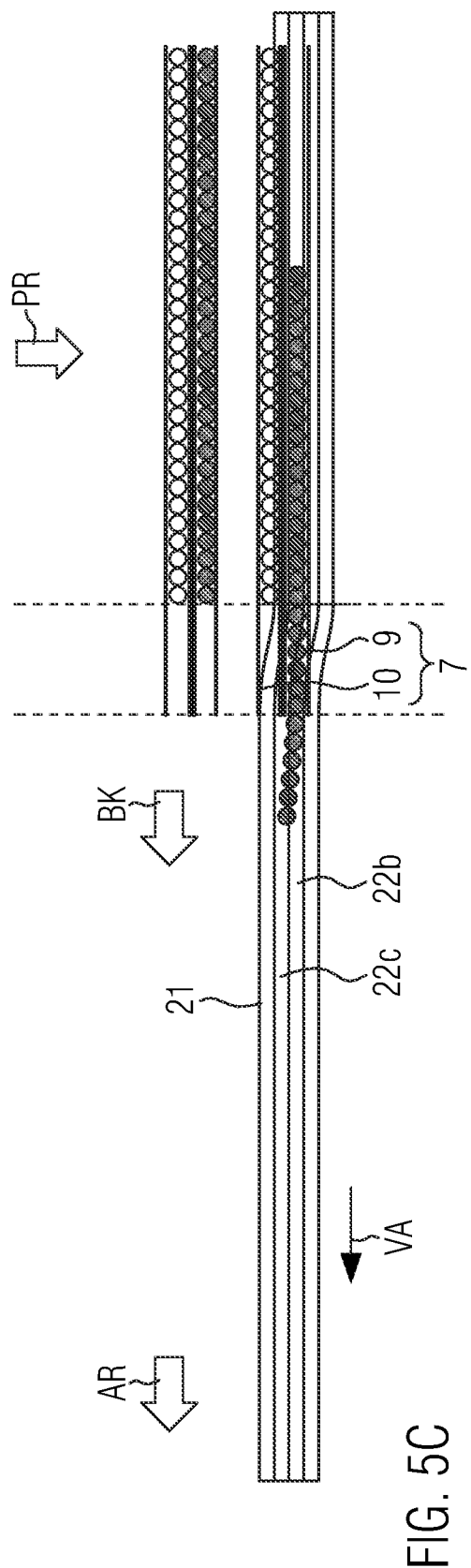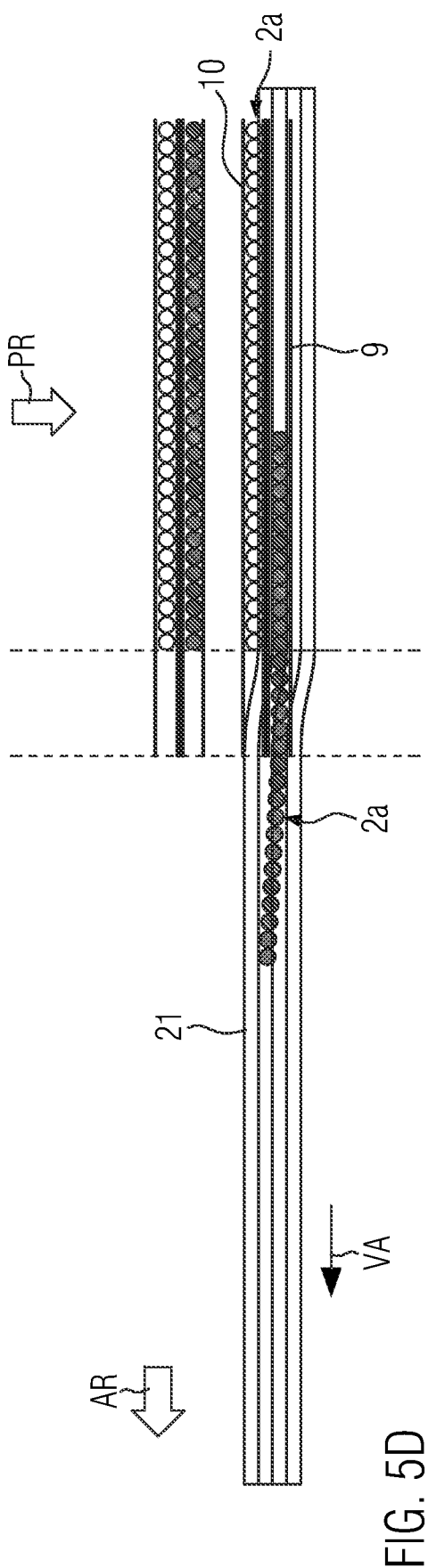

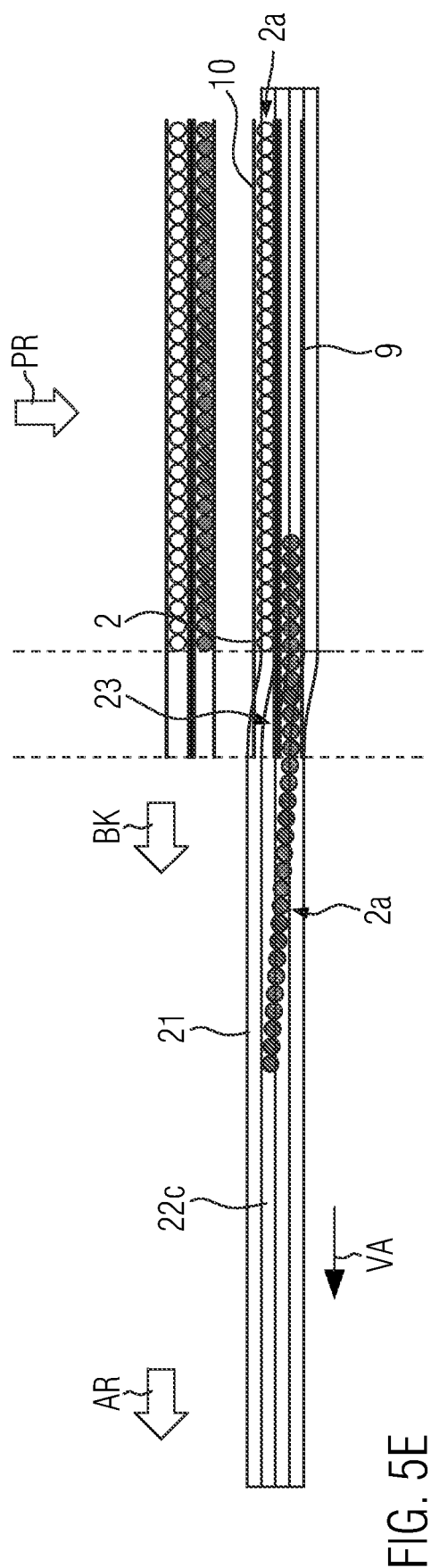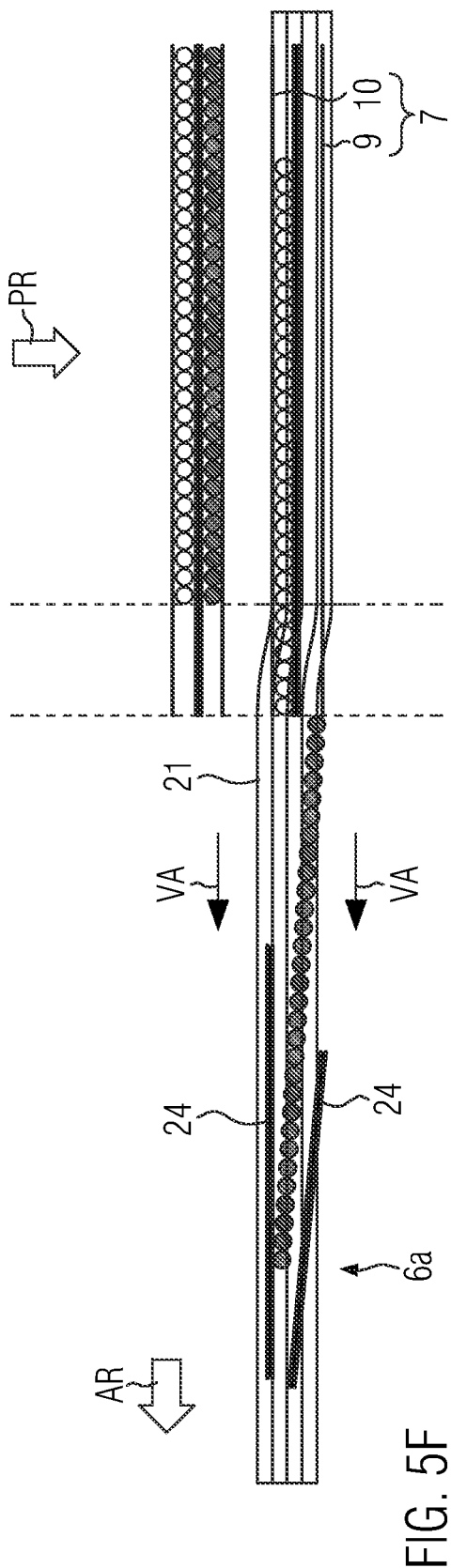

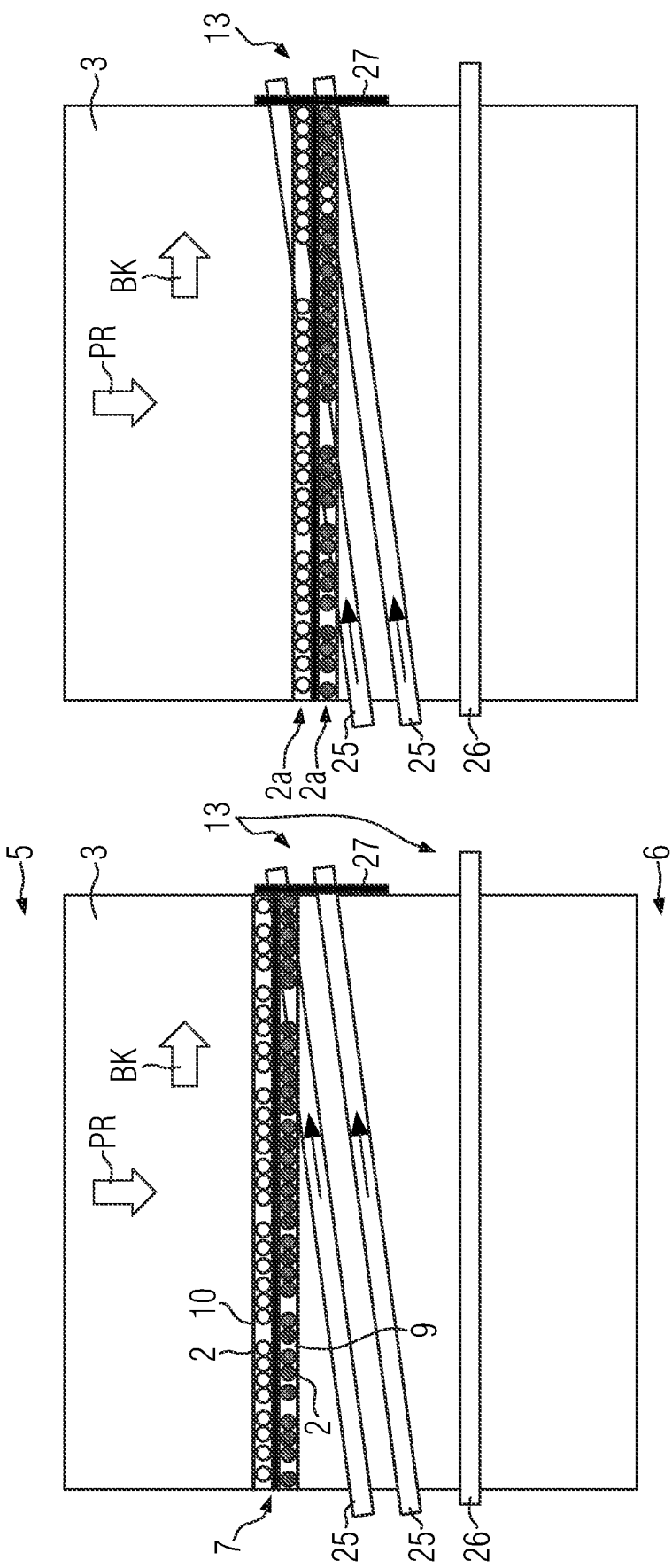

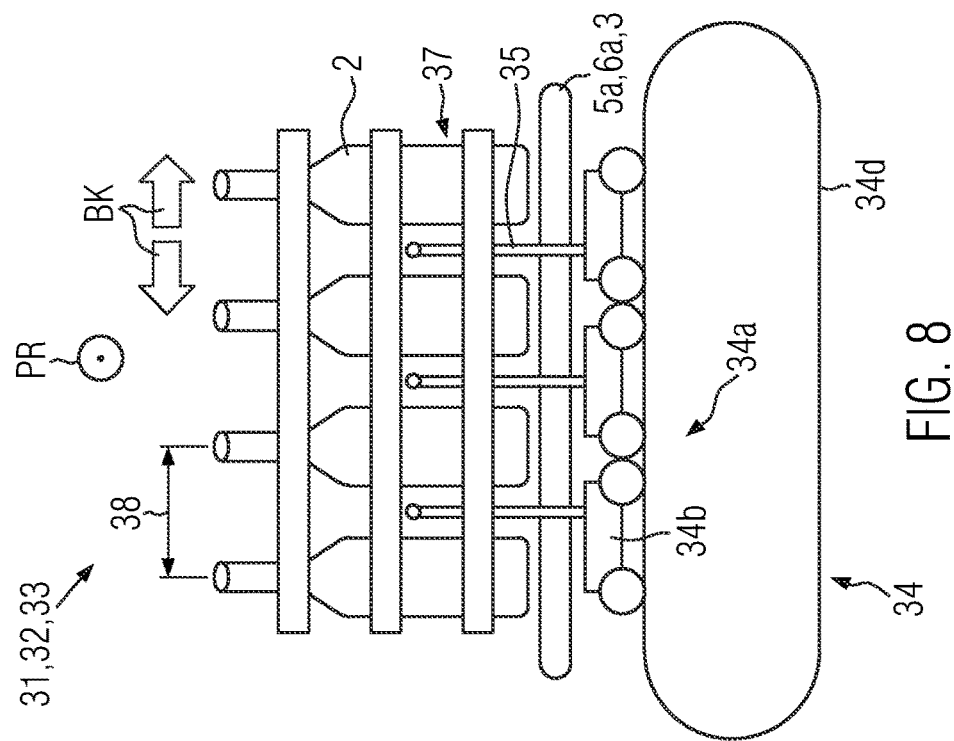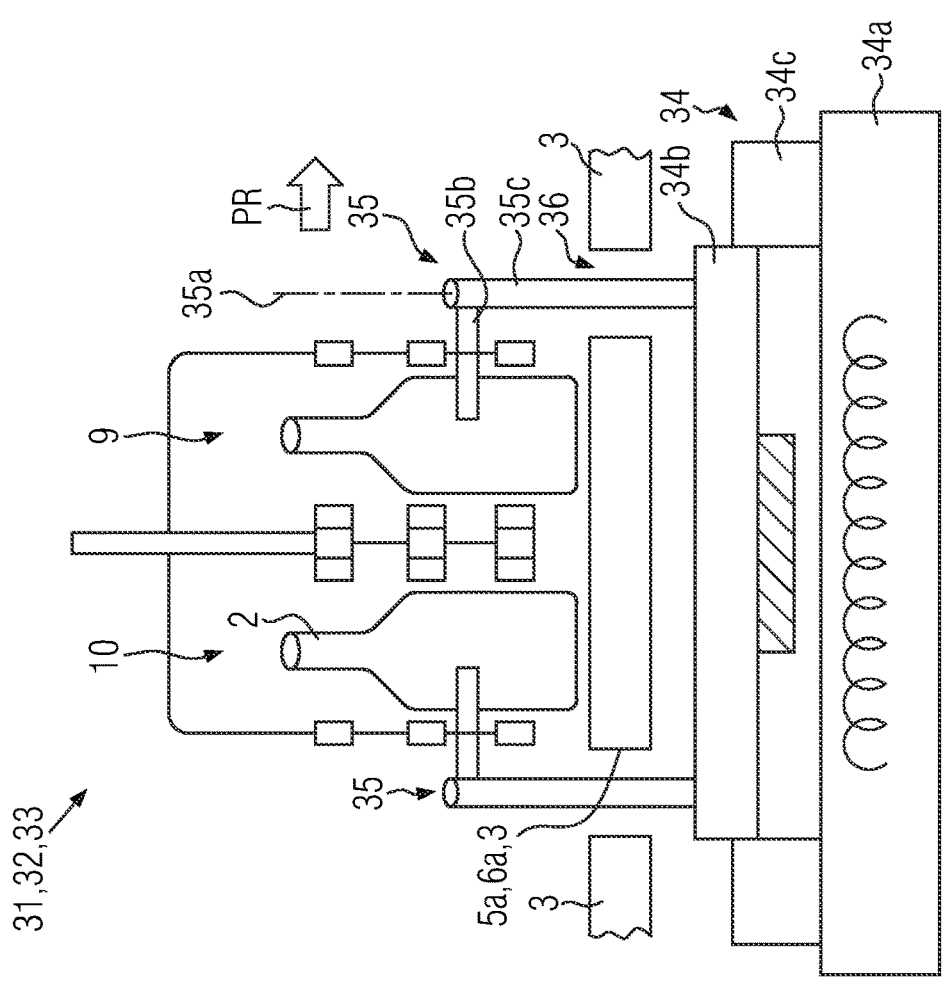

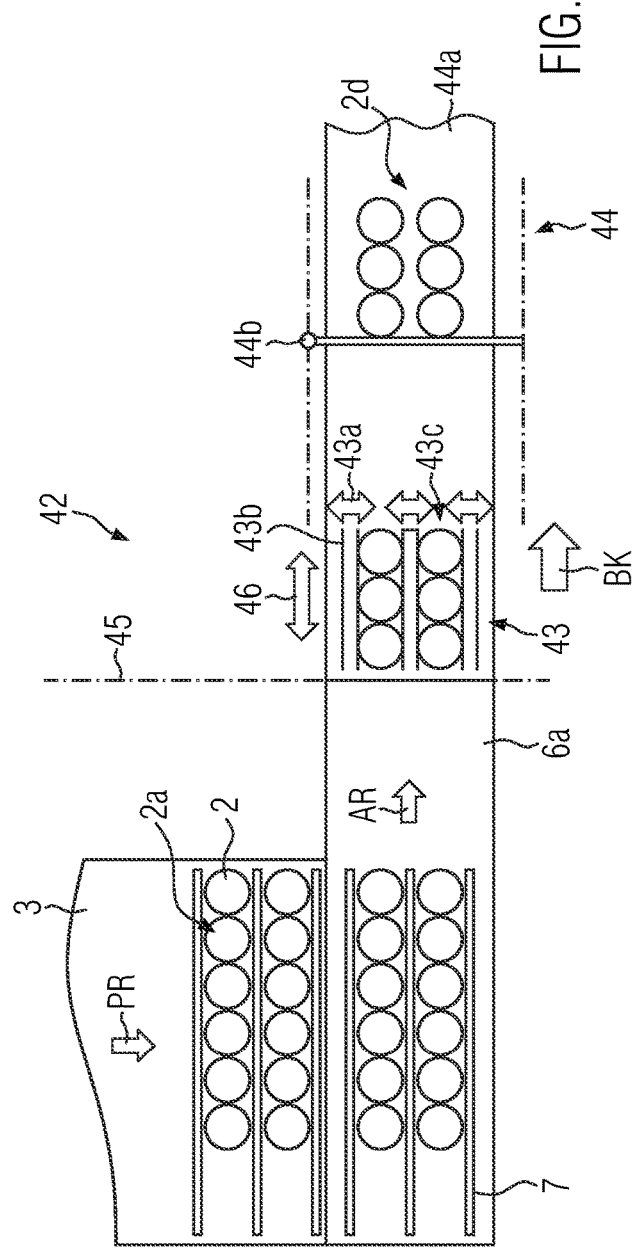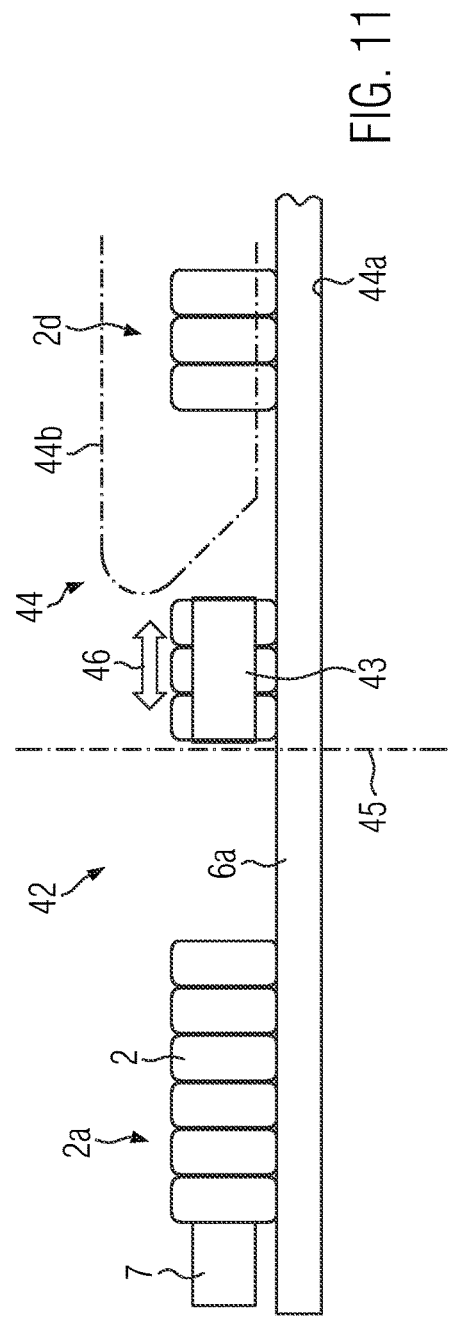

METHOD AND DEVICE FOR BUFFERING CONTAINERS

CROSS REFERENCE TO RELATED APPLICATION

The present application claims priority to German Patent Application No. 102020207677.4 filed on Jun. 22, 2020. The entire contents of the above-listed application is hereby incorporated by reference for all purposes.

TECHNICAL FIELD

The invention relates to a method and a device for buffering containers in a container treatment plant.

BACKGROUND

A generic method and a generic device are known from DE 10 2018 211 859 A1. According to it, single-row container groups, for example consisting of beverage bottles, may be pushed over a buffer surface by means of transversely oriented row pushers without any pile-up pressure. In connection with a container inlet and container outlet each oriented transversely to the buffer direction, thus a buffer device is formed which can buffer the container flows with an efficient utilisation of space, for example according to the first-in-first-out principle.

SUMMARY

However, in particular the process during the storage and withdrawal of the container groups at the transition from the container inlet/container outlet to the buffer surface, that means when the container groups are picked-up by the row pushers or when the containers are discharged from the row pushers, has proved to be disadvantageous. To optimise the storage operation, it was suggested to drive the container groups in the inlet region transversely along a serrated line in front of the approaching row pushers to facilitate the transfer by the row pushers. However, this requires comparably slow relative motions of the row pushers pushed forward in the inlet region and the outlet region and the container groups running in or out transversely thereto. In particular, processes during the storage and withdrawal operations where the containers are guided in the row pushers both by leading and by trailing guides are desirable, that means by guiding channels extending transversely to the buffer direction. In the generic method, the containers are, in contrast, only guided by row pushers in a trailing manner which highly restricts changes of the feed rate to prevent the containers from tipping over.

Therefore, there is a demand for methods and devices improved with respect to the generic methods for buffering containers grouped in single rows while maintaining a spatial separation of such container rows during buffering.

This object is achieved by the method and the device disclosed herein.

The method is used to buffer containers, in particular bottles, in a container treatment plant, in particular a filling line. The containers are stored in single rows by means of at least one inlet conveyor belt in an inlet direction, are shifted in single rows on a transversely adjacent buffer surface by shuttles with row pushers guided on rails and driven individually in a buffer direction transverse to the inlet direction, and are withdrawn by means of at least one outlet conveyor belt adjacent to the buffer surface in the buffer direction in an outlet direction transverse to the buffer direction. As an alternative, the containers can be withdrawn by means of at least one planar motor armature that can be driven towards the buffer surface adjacent in the buffer direction and that is in particular driven two-dimensionally.

According to the invention, the containers are moved in a controlled manner transversely to the buffer direction during the storage and/or the withdrawal operations, and are thereby decelerated or accelerated with respect to the inlet conveyor belt/outlet conveyor belt. This means that the containers are not only moved by the inlet conveyor belt/outlet conveyor belt in the inlet region/outlet region, but are actively manipulated by at least one movement component acting transversely to the buffer direction. In particular, the containers are thereby decelerated or accelerated transverse to the buffer direction, while they are guided laterally in the row pushers in the buffer direction and against the buffer direction.

Thereby, even intermittent feed motions of the row pushers and continuous inlet movements and/or outlet movements of the containers with respect to the row pushers can be flexibly coordinated with each other. To this end, the feed motion of the row pushers and the manipulation of the containers transverse thereto are coordinated in place and time by means of an electronic control of the shuttles and the inlet and/or outlet conveyor belt.

This in particular serves to store and/or withdraw single-row container groups following each other without gaps in the inlet direction and/or the outlet direction which will be referred to as container rows for the sake of simplicity. This means that a container flow running in without gaps is split into container rows which follow each other without gaps both as to time and seen in the inlet direction, and then, in particular each container row runs into a separate row pusher. During the withdrawal, the container rows may then be combined in reverse order into a container flow without time gaps and gaps in the outlet direction.

The containers may be grouped on the inlet conveyor belt into container rows following each other without gaps in particular in the inlet direction, and are decelerated, while they are respectively running in into an associated row pusher on a deceleration belt slowing down from an inlet speed of the inlet conveyor belt in particular to a standstill. In the process, the row pusher pushes the respective container row into the buffer direction from the inlet conveyor belt over the deceleration belt. Subsequently, the deceleration belt can be accelerated again to guide a container row following on the inlet conveyor belt in particular without gaps in the inlet direction onto the deceleration belt.

By the slowing down deceleration belt, a jerky striking of the containers at the end of the row pusher and/or against leading containers, and thus a tipping over and/or a damage of the containers, can be avoided. By slowing down the decelerating belt, moreover, the timing of the running-in of the containers into the row pusher and the feed of the row pusher in the buffer direction can be coordinated in time such that container rows entering the region of the row pusher one after the other are arranged matching to the respective feed position of the associated row pusher.

A deceleration of the deceleration belt to a standstill is in particular advantageous if at the end of the row pushers, there are no stops for the respective container row. In this case, the container rows can each run in exactly to the end of the row pusher by a controlled deceleration of the deceleration belt and stopped there. If, however, a stop is provided at the end of the row pushers, a comparably slow continuation of the deceleration belt can be utilised to have the containers run in without gaps against each other and against the stop.

The deceleration belt may run, at the beginning of the introduction of a certain container row, at the inlet speed of the inlet conveyor belt to permit a transfer of the containers from the inlet conveyor belt to the deceleration belt as smooth as possible. However, this is not obligatory, a speed of the deceleration belt reduced compared with it would also be conceivable. For example, the maximum speed of the deceleration belt during the storage operation is at least 90% of the inlet speed of the inlet conveyor belt, and the minimum speed of the deceleration belt during the storage operation is at most 10% of the inlet speed of the inlet conveyor belt.

The containers running in on the inlet conveyor belt may be deflected against the buffer direction to inlet positions which are aligned with the feed position of the associated row pusher at the time of the running-in of the respective container into the row pusher, seen in the inlet direction. The inlet positions are established on the inlet conveyor belt such that the individual containers are arranged at the opening of the guiding channel of the row pusher when they each arrive at the latter and can run into it. This is done taking into consideration the constant inlet speed of the inlet conveyor belt and the optionally changing feed rate and/or a clocked feed of the row pushers. Thereby, a reliable and collision-free running-in of the containers into the row pushers with a continuous container supply can be generated.

The containers may be deflected by means of a deflection rail which is initially extended transversely to the inlet direction and in the process moves along, with its free end, with the respective foremost container of the respective container row at the inlet speed. The deflection rail is stopped when it reaches the inlet position of the foremost container and then retracted again corresponding to the inlet positions of the respective subsequent containers of the container row. Thereby, each individual container can be offset to a suited inlet position upstream of the row pushers which corresponds to the feed position of the associated row pusher at the time of the running-in of the respective container.

The inlet position can be understood as an offset of the respective container against the buffer direction starting from the uniform trajectory of the container flow upstream of the deflection rail. This offset is controlled on the basis of a previously set trajectory of the row pushers corresponding to their feed positions when the respective container arrives by extending, moving along, stopping, and retracting the deflection rail.

A minimum distance of at least 80% of the footprint width of the containers, each seen in the buffer direction, may be maintained between successive container rows in the region of the deceleration belt. Thereby, a just decelerated container row already has lost sufficient frictional contact with the deceleration belt before the latter is accelerated again for introducing the subsequent container row. In other words, there will thus be sufficient time to accelerate and decelerate the deceleration belt for each individual container row. The minimum distance can be maintained, for example, by the guiding channels of the row pushers being held at a suited distance from each other in the buffer direction during the storage operation. For example, two row pushers are then rigidly arranged at the respective shuttle at a suited distance with respect to each other.

The containers in the row pushers run from the inlet conveyor belt onto the deceleration belt via a belt transition may extend obliquely with respect to the inlet direction. Thereby, a subsequent, yet not decelerated container row cannot bump into an already decelerated container row. Moreover, jerky changes of speed of the containers at the transition from the inlet conveyor belt to the deceleration belt can be avoided should they run at different speeds.

In the process, the row pushers continue to guide the containers transversely to the buffer direction despite an oblique extension, with respect to it, of the inlet conveyor belt and the deceleration belt in the region of the belt transition. The deceleration belt and the inlet conveyor belt extend at an angle of at most 45° obliquely with respect to the inlet direction at the belt transition.

In a further advantageous embodiment, during the withdrawal, a leading container row in the associated row pusher is pushed, in the buffer direction, onto the outlet conveyor belt via an acceleration belt in particular running at the outlet speed of the outlet conveyor belt, whereas a directly following container row in the associated row pusher is pushed onto the acceleration belt, decelerated with respect thereto and in particular standing still, is successively accelerated to the outlet speed and guided onto the outlet conveyor belt. This may be done such that the following container row follows the leading container row on the outlet conveyor belt in the outlet direction without gaps.

Thus, the container rows buffered in a spatially separated manner can, in particular with a continuously running outlet conveyor belt, combined again into a container flow without time gaps and gaps in the outlet direction.

The following container row in the associated row pusher may run from the acceleration belt to the outlet conveyor belt via a belt transition extending obliquely with respect to the outlet direction. Thereby, a jerky belt transition to the outlet conveyor belt can be avoided.

Here, the row pushers cause a guidance of the container row into the outlet direction despite the obliquely extending belt transition between the acceleration belt and the outlet conveyor belt. That means that the acceleration band and the outlet conveyor belt each extend obliquely with respect to the outlet direction at the belt transition, in particular at an angle of at most 45° to the outlet direction, so that the containers are guided further in the outlet direction each by the guiding channel of the row pusher.

In a further advantageous embodiment, the containers are pushed against each other within the row pushers by at least one grouping belt integrated in the buffer surface and extending transversely to the buffer direction, and/or are driven from leading row pushers next to the buffer surface and from there back again into respective following row pushers. Thereby, for example, optionally existing gaps between containers in the row pushers can be closed, and/or excessive containers can be removed from row pushers or missing containers inserted into row pushers.

In a further advantageous embodiment, catches guided underneath the inlet conveyor belt and/or the outlet conveyor belt and/or the buffer surface are, driven by a motor, rotated inwards into the row pushers and between containers adjacent therein transverse to the buffer direction, through through-slots extending at the row pushers transversely to the buffer direction. Furthermore, the catches are then moved along the through-slots by a motor to create an outlet partitioning of the containers and/or to group the containers and/or to accelerate the containers for the transfer to the outlet conveyor belt.

The catches are, for example, individually driven by a conveyor means arranged underneath the buffer surface, for example a linear unit, and from there project upwards through a through-slot extending in the transport plane transversely to the buffer direction in order to shift individual or a plurality of containers by the conveyor means in the row pusher. Thereby, the containers can be additionally grouped in the region of the inlet conveyor belt and/or the outlet conveyor belt and/or in intermediate regions of the buffer surface transverse to the buffer direction and/or accelerated to a suited outlet speed.

In a further advantageous embodiment, for the withdrawal, slides with fixing elements for retaining and releasing, in a controlled manner, a group of containers running out from the row pushers between the outlet conveyor belt and a conveyor section following the outlet conveyor belt in the outlet direction are moved into and against the outlet direction in an oscillating manner. Thereby, the groups, pre-grouped corresponding to packs to be produced can be, for example, brought to a suited distance with respect to each other, and/or be synchronised with a conveyor chain or similar conveyor elements present in the conveyor section. This grouping of the containers, for example before the containers are packed, can thus be timely decoupled from the control of the row pushers and the outlet conveyor belt at least partially.

Here, the containers can be retained together by the slides in a number of longitudinal rows (lanes) corresponding to the packs to be produced and be released again at a suited place to be transferred to the conveyor section.

In a further advantageous embodiment, the withdrawal is effected by means of planar motor armatures which approach and enter the region of the row pushers to the buffer surface in a travel direction transverse to the buffer direction, wherein the row pushers shift the containers from the buffer surface onto loading surfaces of the planar motor armatures which are waiting there, and the planar motor armatures move away the containers from the buffer surface in particular while maintaining the travel direction. The withdrawn containers can be removed on the planar motor armatures flexibly and steerably. It is here also conceivable to move the containers away from the buffer surface on the planar motor armatures into the buffer direction. In this case, the row pushers are lifted from the loading surfaces of the planar motor armatures after the containers have been pushed over thereto, so that the containers can no longer collide with the row pushers, seen in the buffer direction.

In the described method, the row pushers that receive the containers may be in single rows and in the buffer direction separated from each other in guiding channels extending transversely to the buffer direction and limited both in and against the buffer direction. Thereby, a two-sided guidance of the containers is given during a standstill, a feed, a deceleration and an acceleration of the row pushers, and also in case of a superposition of movement components transverse to the buffer direction and in the region of inlet conveyor belts, outlet conveyor belts, deceleration belts, and/or acceleration belts extending obliquely with respect thereto.

The device is used for buffering containers grouped in single rows in a container treatment plant, in particular a filling line, and comprises a buffer surface and a transport system arranged above it for shifting the containers on the buffer surface into a buffer direction from an inlet region with at least one inlet conveyor belt extending transversely to the buffer direction into an outlet region with at least one outlet conveyor belt following the buffer surface in the buffer direction and driven transverse thereto. As an alternative, the outlet region can comprise a planar motor system with planar motor armatures that can be approached adjacent to the buffer surface into the buffer direction.

The transport system comprises shuttles guided at rails and driven independently, with row pushers in particular oriented in pairs transversely to the buffer direction to shift the containers grouped in single rows.

According to the invention, the device comprises at least one container manipulator arranged in/at the inlet region and/or outlet region and driven intermittently for accelerating and/or decelerating the containers transverse to the buffer direction and relative to the inlet conveyor belt and/or outlet conveyor belt. Thereby, the advantages described herein can be achieved.

The container manipulator generates, independent of the inlet conveyor belt and/or outlet conveyor belt, at least one movement component extending transversely to the buffer direction by which the containers can be decelerated or accelerated during the storage and/or withdrawal operations. The container manipulator can be, for example, a conveyor belt, catches for the containers driven individually transversely to the buffer direction, and/or slides movable transversely to the buffer direction in an oscillating manner, or the like.

The inlet conveyor belt may comprise a plurality of container paths arranged one next to the other, and the container manipulator is a single-path deceleration belt which is, under the row pushers at a belt transition extending transversely to the inlet direction, adjacent to a front container path, seen in the buffer direction, of the inlet conveyor belt transverse to the buffer direction. Thereby, the advantages described herein can be achieved.

The inlet conveyor belt can here be driven continuously at a predetermined inlet speed. The deceleration belt can here be decelerated from the inlet speed in response to feed positions of individual row pushers, and accelerated again to this speed, in particular until the deceleration belt is standing still and/or starting from a standstill. However, it is also conceivable that the deceleration belt is not exactly accelerated to the inlet speed, but only to a maximum speed of at least 90% of the inlet speed. Equally, as an alternative to a deceleration to a standstill, it is conceivable to decelerate the deceleration belt to a minimum speed of at most 10% of the inlet speed.

The device furthermore may comprise a deflection rail which can be extended obliquely to the inlet direction and synchronously moved along with a container at the inlet speed. After the deflection rail has been extended to a given offset against the buffer direction, it can be stopped and be retracted again while reducing the offset synchronously with the feed of an associated row pusher. Thereby, the advantages described herein can be achieved.

The outlet conveyor belt may comprise a plurality of container paths arranged one next to the other, of which at least one front container path, seen in the buffer direction, extends to the front end of the row pushers, wherein the container manipulator is an in particular single-path acceleration belt which is, under the row pushers at a belt transition extending obliquely to the outlet direction, adjacent to a rear container path of the outlet conveyor belt, seen in the buffer direction, transverse to the buffer direction. The outlet conveyor belt can then be continuously driven at a predetermined outlet speed, while the acceleration belt can be accelerated, in response to the feed positions of individual row pushers, in particular starting from a standstill, to the outlet speed of the outlet conveyor belt.

It is thus possible to withdraw a leading container row with synchronously running outlet conveyor and acceleration belts, to push a following container row first onto the acceleration belt standing still, and to then accelerate the acceleration belt selectively such that the following container row follows the leading container group at the transition to the outlet conveyor belt without time gaps and gaps in the outlet direction.

In a further advantageous embodiment, the device furthermore comprises a container manipulator integrated in the buffer surface and having at least one grouping belt extending obliquely to the buffer direction and driven intermittently in the direction towards the end of the row pushers, for pushing containers against each other within individual row pushers in single rows. Thereby, gaps possibly existing between the containers can be closed within the row pusher.

In a further advantageous embodiment, the device furthermore comprises a container manipulator integrated in the buffer surface with at least one grouping belt extending transversely and in particular orthogonally to the buffer direction which is driven intermittently and bidirectionally for exchanging containers between individual row pushers, and which extends beyond the end of the row pushers in particular on the outlet side. Thereby, excessive containers can be temporarily driven out of a row pusher and next to the buffer surface, and/or missing containers can be introduced from the region next to the buffer surface into not completely filled row pushers.

In a further advantageous embodiment, the container manipulator comprises a conveyor means extending underneath the inlet conveyor belt and/or the outlet conveyor belt transversely to the buffer direction and catches attached thereto which can be, driven by a motor, rotated inwards into the row pushers between the containers through through-slots embodied in the row pushers to shift the containers transverse to the buffer direction by driving the conveyor means.

In particular, the catches can then be rotated inwards between the containers to create an outlet partitioning of the containers and/or to group the containers within the respective container row, and/or to accelerate the containers for the transfer to the outlet conveyor belt.

The conveyor means may then be embodied for intermittently accelerating/decelerating the catches between a standstill and an inlet speed/outlet speed. In particular, the containers can then be accelerated within the row pushers from the standstill to the outlet speed for a transfer of the containers to the outlet conveyor belt without jerks.

In a further advantageous embodiment, the device furthermore comprises a container manipulator integrated in the buffer surface with a conveyor means extending underneath the buffer surface transversely to the buffer direction and catches attached thereto which can be, driven by a motor, rotated inwards from underneath the buffer surface to the top into the row pushers between containers adjacent in single rows.

The container manipulator then comprises a transfer region for the containers adjacent to the inlet conveyor belt and/or the outlet conveyor belt, and/or integrated in-between in the buffer surface, with at least one through-slot for the catches extending in parallel to the conveyor means.

The respective catch then projects upwards through the through-slot from the conveyor means to the through-slots of the row pushers. These then stop in the transfer region to shift the containers in the row pushers by the catches moved by the conveyor means. Subsequently, the catches are moved out of the region of the buffer surface by the conveyor means, and the row pushers are moved further in the buffer direction.

In a further advantageous embodiment, the container manipulator comprises a slide movable in/against the outlet direction over the outlet conveyor belt in an oscillating manner, having fixing elements for retaining a group of containers running out of a row pusher in a controlled manner, and for releasing the containers in the region of a conveyor section following the outlet conveyor belt in the outlet direction in a controlled manner, in particular with a thrust chain. Thereby, the advantages described herein can be achieved.

BRIEF DESCRIPTION OF THE FIGURES

Embodiments of the invention are represented in the drawings. In the drawings:

FIGS. 3A-3F show a deceleration of containers during the storage operation;

FIGS. 5A-5F show a deceleration of containers during the withdrawal;

FIGS. 6A-6F show a distribution of containers within and between row pushers;

FIG. 7 shows a schematic cross-section of a container manipulator with catches that can be rotated inwards;

FIG. 8 shows a lateral view of the manipulator according to FIG. 7;

FIG. 10 shows a plan view onto a container manipulator with an oscillating outlet slide;

FIG. 11 shows a lateral view of the container manipulator according to FIG. 10;

DETAILED DESCRIPTION

Figure 1:
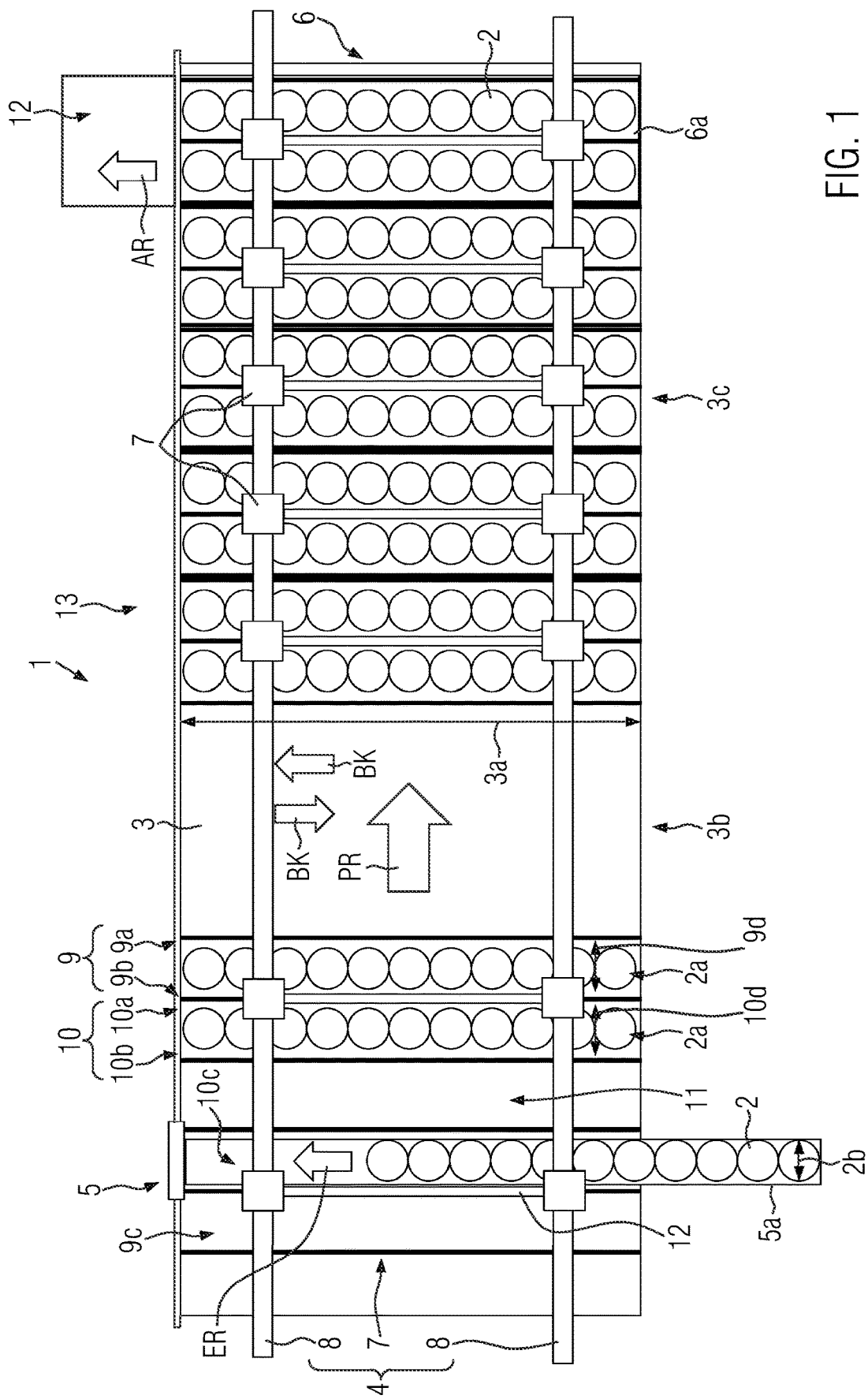
FIG. 1 shows a schematic plan view onto the device.
Figure 2:
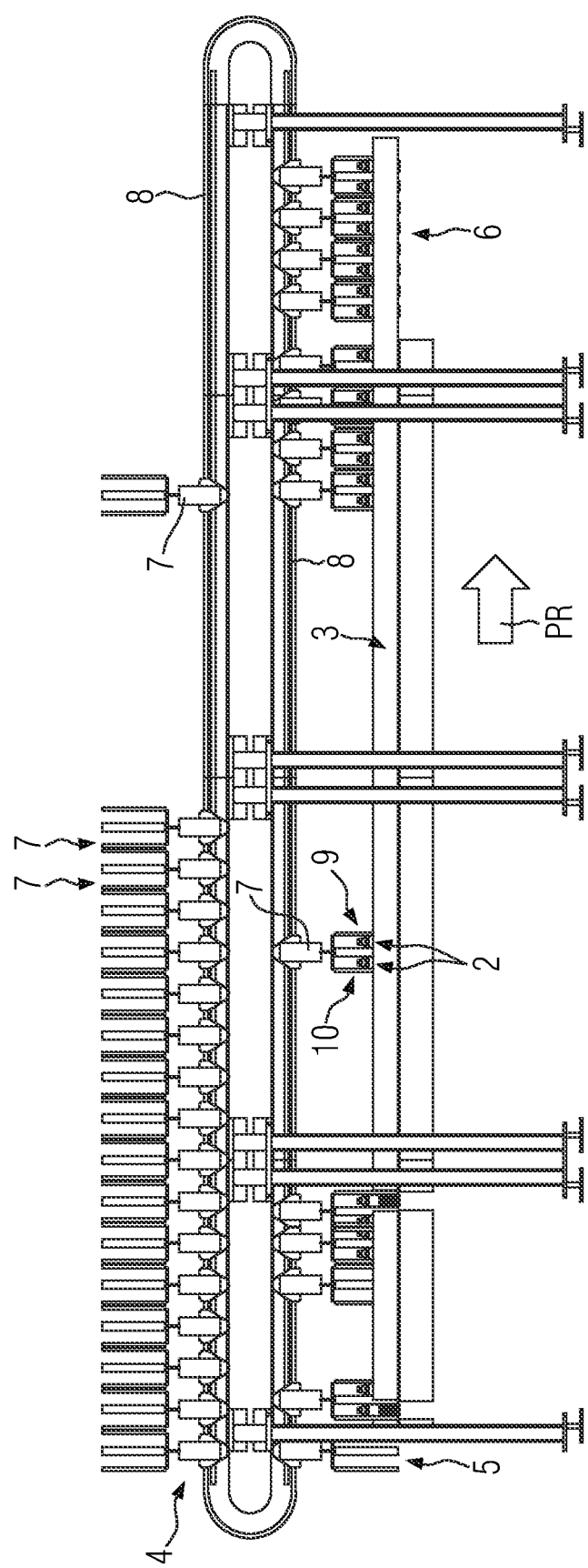
FIG. 2 shows a schematic lateral view of the device.

As can be seen in FIGS. 1 and 2, the device 1 comprises, for buffering containers 2/container rows 2a grouped in single rows, an essentially horizontal and stationary buffer surface 3 and a transport system 4 arranged above it for shifting the containers 2/container rows 2a on the buffer surface 3 into a buffer direction PR from the inlet region 5 with at least one inlet conveyor belt 5a to an outlet region 6 with at least one outlet conveyor belt 6a.

The at least one inlet conveyor belt 5a extends in an inlet direction ER, and the outlet conveyor belt 6a in an outlet direction AR, each transversely and in particular orthogonally to the buffer direction PR of the transport system 4.

The transport system comprises independently driven shuttles 7 and rails 8 embodied as closed orbit where the shuttles 7 run along.

The shuttles 7 may comprise at least one front row pusher 9 (seen in the buffer direction PR) and a row pusher 10 in the rear with respect to it. The shuttles 7, however, could also comprise each only one of the row pushers 9, 10.

The row pushers 9, 10 arranged one behind the other at the shuttle 7 in the buffer direction PR could also be considered as twin row pushers. Each row pusher 9, 10 is embodied for receiving the containers 2 in single rows, that means for receiving the container rows 2a spatially separated, and are oriented transversely, in particular orthogonally, to the buffer direction PR.

The row pushers 9, 10 could also be considered as spatially separated buffer lines for the individual container rows 2a movable in the buffer direction PR.

The row pushers 9, 10 are embodied for guiding the containers 2 grouped in single rows each in a leading and a trailing position, and thus for guiding them laterally both in the buffer direction PR, that means when they are fed in the buffer direction PR, for example when the feed is accelerated, and against the buffer direction PR, in particular when the feed is decelerated.

The containers 2 can be, for example, bottles. The containers 2 have a diameter 2b.

To this end, the row pushers 9, 10 comprise each a front row guide 9a, 10a preceding the containers 2, and a rear row guide 9b, 10b following the containers 2, as well as guiding channels 9c, 10c each limited by them for receiving and guiding the containers 2/individual container rows 2a on two sides.

The row pushers 9, 10 or their guiding channels 9c, 10c have a clear width 9d, 10d each defined between the front row guide 9a, 10a and the rear row guide 9b, 10b, which can be adapted to the diameter 2b of the containers 2 (when the cross-section is not circular, to the respective container width in the buffer direction PR).

The row pushers 9, 10 may extend essentially across the complete width 3a of the buffer surface 3 and may have a width (transverse to the buffer direction PR) of 3 to 6 m, in particular 4 to 5.5 m.

In FIGS. 1 and 2, furthermore possible arrangements of a container manipulator 11 on the inlet side, a container manipulator 12 on the outlet side, and a container manipulator 13 integrated in-between in the buffer surface 3 are schematically indicated by way of example.

The container manipulators 11, 12, 13 have in common that they can apply a movement component BK to the containers 2, independent of the inlet conveyor belt 5a and/or the outlet conveyor belt 6a, which acts transverse to the buffer direction PR (only indicated schematically in FIG. 1 and, independent of the location, in the region of the buffer surface 3).

To this end, the container manipulators 11, 12, 13 can be driven in and/or against the inlet direction ER/outlet direction AR, but also extend obliquely with respect thereto at least in sections in the region of the row pushers 9, 10.

The movement component BK oriented transversely to the buffer direction PR serves to purposefully decelerate or accelerate the containers 2 in the inlet region 5 and/or the outlet region 6, or to partition, group and/or distribute the containers 2 in the region of the buffer surface 3 between the inlet region 5 and the outlet region 6.

As FIGS. 3A to 3F illustrate in the schematic plan view onto the inlet region 5, the container manipulator 11 on the inlet side can essentially be formed by a deceleration belt 14 driven separately from the inlet conveyor belt 5 and intermittently.

The inlet conveyor belt 5 is accordingly embodied with several paths, so that principally a plurality of container rows 2a could be transported one next to the other on the inlet conveyor belt 5a. In practice, however, the containers 2 are supplied on the inlet conveyor belt 5a as a single-row container flow essentially without gaps in the inlet direction ER. In the example, the inlet conveyor belt 5a comprises three container paths 15a, 15b, 15c extending one next to the other.

As can be seen in FIG. 3A in the general layout, and is furthermore represented in FIGS. 4A to 4F in the sequence, the containers 2 are laterally offset against the buffer direction PR from a front container path 15a with respect thereto to a rear container path 15c with respect thereto, and are thereby grouped into container rows 2a following each other without time gaps and gaps in the inlet direction ER.

The deceleration belt 14 is adjacent to the front container path 15a underneath the row pushers 9, 10 in the form of a belt transition 16 extending obliquely to the inlet direction ER. The container paths 15a to 15c and the deceleration belt 14 accordingly altogether follow an essentially S-shaped course, the deceleration belt 14 extending downstream of the belt transition 16 in extension of the front container path 15a.

The deceleration belt 14 can be decelerated and accelerated between a standstill and the inlet speed VE of the inlet conveyor belt 5a. In principle, it would also be conceivable that the deceleration belt 14 is operated within a speed range of 10% to 90% of the inlet speed VE (that means it is not completely decelerated to a standstill and not completely accelerated to the inlet speed VE). Thereby, the sequence described below would also be principally possible.

Accordingly, FIG. 3A shows a state where a front container row 2a (in the inlet direction ER) enters into the front row pusher 9 of a shuttle 7 from the front container path 15a (in the buffer direction PR) via the belt transition 16 onto the deceleration belt 14 that may be running at the inlet speed VE. The container row 2a following without time gaps and gaps in the inlet direction ER (here the central row) is shifted in a suited manner onto the container paths 15a to 15c on the inlet conveyor belt 5a by an offset 17 against the buffer direction PR, as will be described below with reference to FIGS. 4A to 4F.

For the sake of good order, a further (here rear) container row 2a is represented which is still part of the container flow without gaps and will consequently also be stored as described below.

FIG. 3B shows a state where the front container row 2a has completely entered the front row pusher 9, so that the deceleration belt 14 is directly afterwards slowed down with respect to the inlet speed VE to successively decelerate the front container row 2a in the front row pusher 9.

Here, the containers 2 are guided on both sides in the guiding channel 9c of the front row pusher 9, so that the deceleration and further storage of the containers 2 is possible without hindrance despite the oblique belt extension at the belt transition 16 and a subsequent feed of the row pushers 9, 10 in the buffer direction PR.

One can furthermore see that the foremost container 2 of the central container row 2a has been offset to a first inlet position 18a by the offset 17 against the buffer direction PR, the inlet position 18a being aligned with a first feed position 19a of the associated rear row pusher 10 when the foremost container 2 arrives there. The shuttle 7 with the row pushers 9, 10 is here temporarily stationary at the feed position 19a.

The deceleration of the deceleration belt 14 may begin directly after the point in time represented in FIG. 3B, that is as soon as the container row 2a has completely run into the front row pusher 9 and all containers 2 of the container row 2a are guided laterally in the row pusher 9 during the deceleration.

FIG. 3C shows a state where the deceleration belt 14 has been decelerated to half the inlet speed VE. Accordingly, the row pushers 9, 10 are still located at the first feed position 19a (represented in FIG. 3B), so that all containers 2 of the following container row 2a with the previously set first inlet position 18a can run into the rear row pusher 10 positioned in this way.

As can in particular be seen in FIG. 3C, the oblique belt transition 16 permits that the central container row 2a following at the inlet speed VE cannot bump into the front container row 9 decelerated by the deceleration belt 14 and can thus run into the guiding channel 10c of the rear row pusher 10 without collision.

This is represented in FIG. 3D for the front container row 2a that has completely run into the front row pusher 9 with a deceleration belt 14 that is meanwhile standing still. Accordingly, the shuttle 7 with the row pushers 9, 10 has slightly moved further in the buffer direction PR to a second feed position 19b, so that now one container 2 runs into the rear row pusher 10 with a second inlet position 18b aligned therewith. Meanwhile, the front row pusher 9 pushes the previously already completely entered container row 2a into the buffer direction PR from the deceleration belt 14 standing still further into the direction of the buffer surface 3.

FIG. 3E shows a state after the front row pusher 9 with the front container row 2a stored therein has left the region of the deceleration belt 14 and the deceleration belt can be accelerated to the inlet speed VE again.

Furthermore, one can see that meanwhile, a container 2 of the central container row 2a with a third inlet position 18c runs into the rear row pusher 10 meanwhile correspondingly pushed forward to a third feed position 19c.

FIG. 3F finally shows a state where the deceleration belt 14 is running again at the inlet speed VE, and the shuttle 7 with the row pushers 9, 10 has been stopped in a temporarily stationary fourth feed position 19d. Correspondingly, the rearmost containers 2 of the central container row 2a run into the rear row pusher 10 at a fourth inlet position 18d aligned therewith.

FIG. 3F furthermore indicates, schematically and not to scale, that in the region of the deceleration belt 14 between the guiding channels 9c, 10c of the row pushers 9, 10, a distance 20 is always kept which permits a sufficient decoupling of the drive of adjacent container rows 2a in the row pushers 9, 10 in the buffer direction PR. The distance 20 may be at least 80% of the diameter 2b (see FIG. 1) of the containers 2.

Consequently, the decelerating movement component BK is only applied to one of the container rows 2a at a time by the deceleration belt 14 (according to the represented sequence in FIGS. 3B and 3C).

As FIGS. 3A to 3F illustrate, a container flow running in without time gaps and gaps in the inlet direction ER can be continuously partitioned to row pushers 9, 10 succeeding in the buffer direction PR by means of the movement component BK caused by the first container manipulator 11 transverse to the buffer direction PR.

The deceleration belt 14 permits, in particular by the oblique belt transition 16, not only a suited adaptation of the timing during the storage operation and a jerk-free running-in of the containers 2 into the row pushers 9, 10, but also prevents collisions of the successive container rows 2a during deceleration. Damages and a tipping over of the containers 2 can thus be reliably avoided during the storing into the row pushers 9, 10.

For example, delays of −0.2 to −0.6 m/s$^2$ of the deceleration belt 14 during the running-in of the container rows 2a into the row pushers 9, 10 are practicable.

FIGS. 4A to 4F schematically illustrate how the offset 17 against the buffer direction PR and thus the inlet positions 18a-18d of the individual containers 2 can be produced.

Accordingly, the device 1 to this end may comprise a deflection rail 21 which can be extended at an angle 22 oblique to the inlet direction ER against the buffer direction PR. Furthermore, the free end 21a of the deflection rail 21 can be synchronously moved along with the respective foremost container 2 of a container row 2a at the inlet speed VE.

Figure 4A:
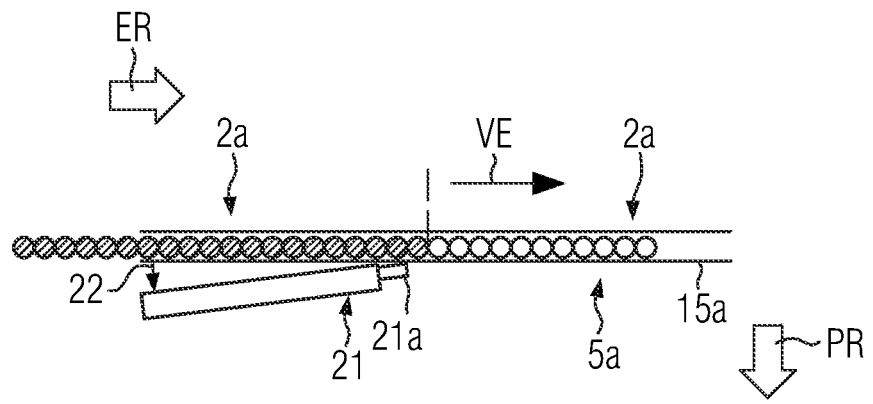
FIGS. 4A-4F show a production of inlet positions on the inlet conveyor belt.

FIG. 4A shows a state with a completely retracted deflection rail 21. Its free end 21a is here not in contact with the containers 2 running on the front container path 15a.

Figure 4B:
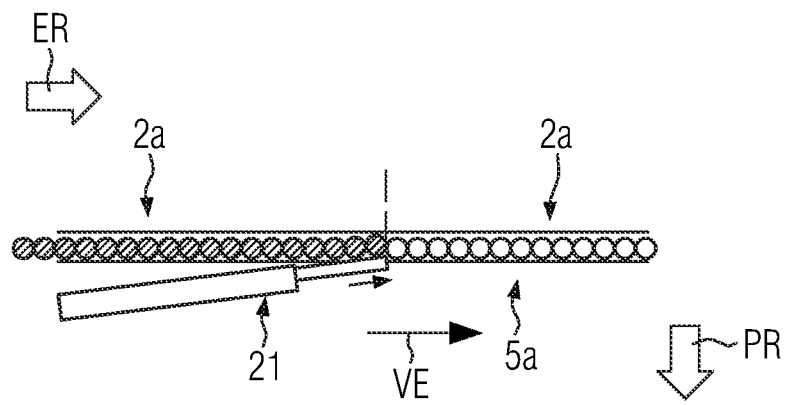

FIG. 4B shows a state where the deflection rail 21 has already been extended such that its free end 21a deflects the foremost containers 2 of the container row 2a to be deflected against the buffer direction PR. Here, the deflection rail 21 is running synchronously along with the containers 2 in the inlet direction ER.

Figure 4C:
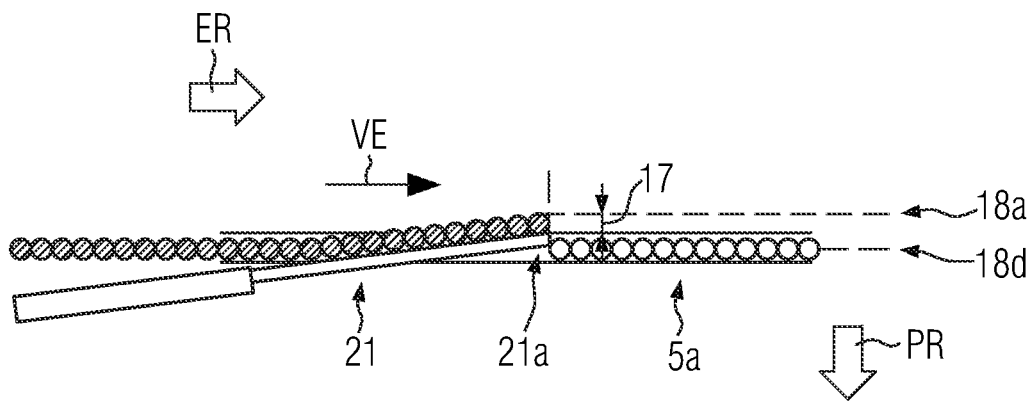

FIG. 4C shows a state with a completely extended deflection rail 21, wherein the containers 2 run along at the deflection rail 21 obliquely to the inlet direction ER and are offset at their free end 21a by a maximum offset 17 with respect to their original trajectory.

Downstream of the deflection rail 21, the containers maintain the respectively generated offset 17 and are thus initially transported, with an inlet position 18a adjusted in this way, on the inlet conveyor belt 5a to the associated row pusher 9, 10 (see FIGS. 3A to 3C).

Containers 2 not deflected by the deflection rail 21 in contrast run without offset 17 at the corresponding inlet position 18d to the row pushers 9, 10 (see FIG. 3F).

Figure 4D:
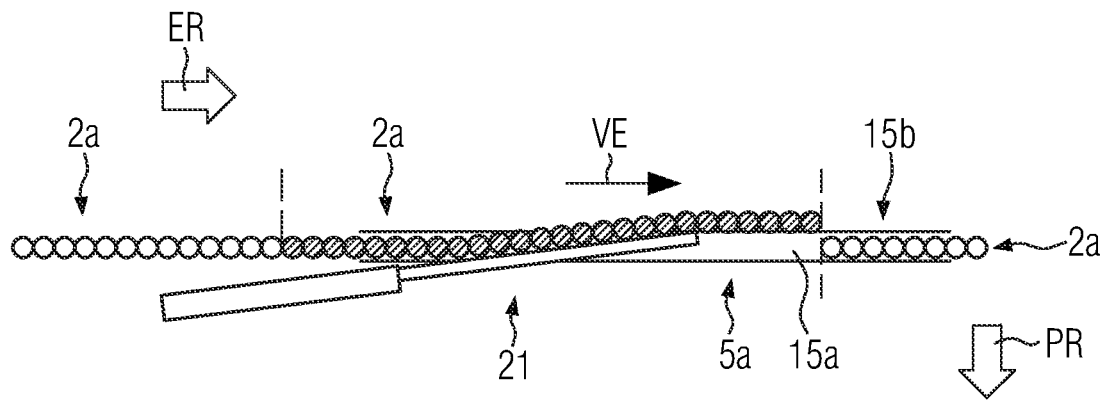

FIG. 4D shows a state with an unchanged position of the deflection rail 21, directly before it is successively retracted again.

Figure 4E:
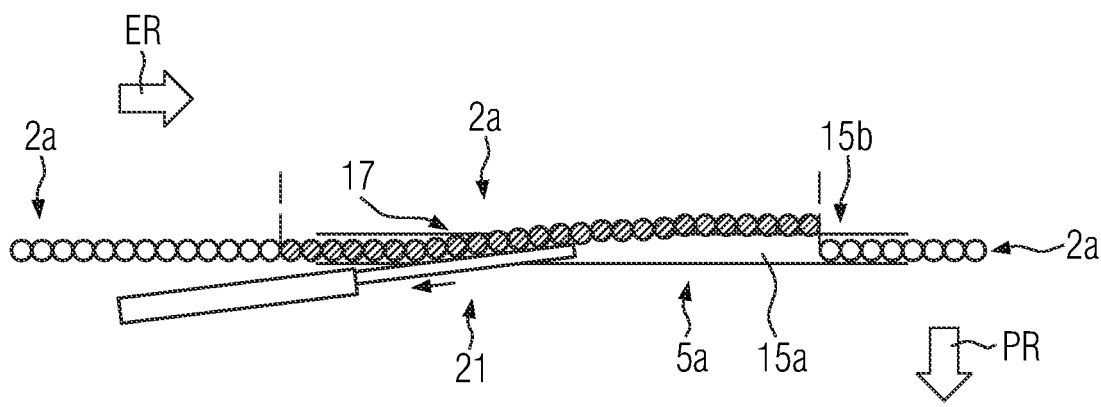

As can be seen in FIG. 4E, a subsequent successive retraction of the deflection rail 21 leads to a reduction of the offset 17 for subsequent containers 2. Thereby, their inlet positions 18b-18d are adapted to the corresponding feed positions 19b-19d of the associated row pusher 9, 10 at the respective point in time of the running-in of the containers into the row pusher 9, 10 (see FIGS. 3D to 3F).

Figure 4F:
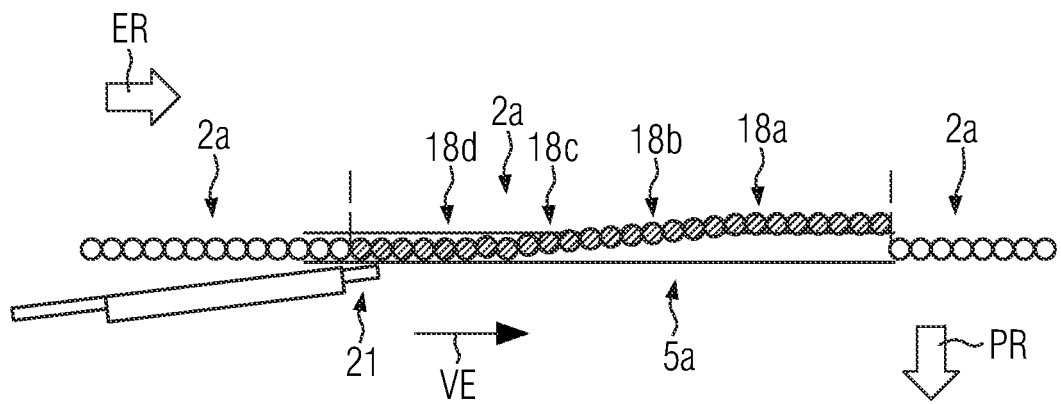

FIG. 4F shows the deflection rail 21 again in its completely retracted position, so that the last containers 2 of the respective container row 2a are no longer deflected by the deflection rail 21 and can accordingly run in at a stationary feed position 19d of the associated row pusher 9, 10.

As can in particular be seen in FIG. 4F, with the offset 17, different inlet positions 18a-18d can be generated both for temporarily constant feed positions 19a, 19d of the row pushers 9, 10 and for continuously changing feed positions 19b, 19c. Thereby, suited inlet positions 18a-18d of the containers 2 can be generated for different motion sequences during the storage into the row pushers 9, 10 depending on the control of the deflection rail 21.

As FIGS. 5A to 5F illustrate in the schematic plan view onto the outlet region 6, the container manipulator 12 on the outlet side can be designed for generating the movement component BK of an acceleration belt 21 separate from the outlet conveyor belt 6a and driven intermittently.

Accordingly, the outlet conveyor belt 6a may also be embodied with a plurality of paths, for example with a front container path 22a in the buffer direction PR, a central container path 22b, and a rear container path 22c, which is followed by the acceleration belt 21 at a belt transition 23 on the outlet side in the region of the row pusher 9, 10 extending obliquely with respect to the outlet direction AR.

Figure 5A:
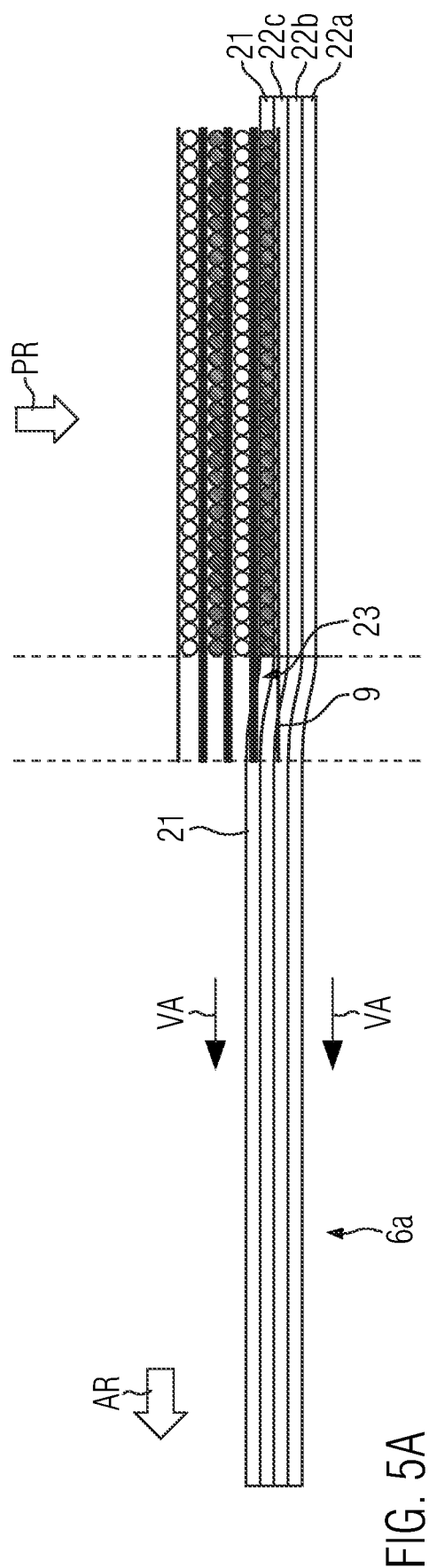

As can be seen in FIG. 5A in this respect, initially, a leading container row 2a is running in the corresponding front row pusher 9 both over the acceleration belt 21 and over the central and rear container paths 22*b*, 22*c* of the outlet conveyor belt 6*a*, wherein both the outlet conveyor belt 6*a* and the acceleration belt 21 are driven at the same outlet speed VA.

Figure 5B:
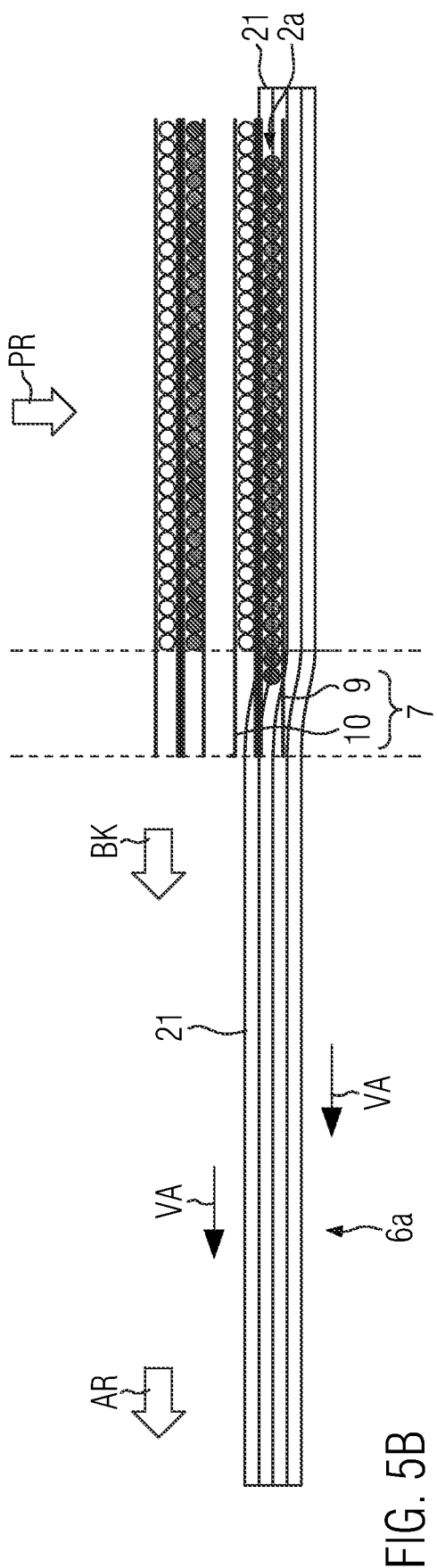

As is illustrated in FIG. 5B, the leading container row 2*a* is therefore initially accelerated by feeding it onto the acceleration belt 21 and the outlet conveyor belt 6*a* by the movement component BK in the outlet direction AR and discharged from the front row pusher 9.

FIG. 5C shows that the shuttle 7 with the row pushers 9, 10 is pushed further forward into the buffer direction PR, and the leading container row 2*a* is thereby pushed within the front row pusher 9 onto the central and rear container paths 22*b*, 22*c* and thus picked up by the outlet conveyor belt 6*a*.

FIG. 5D represents a state where the acceleration belt 21 may be, after the leading container row 2*a* has left its region, decelerated to a standstill, so that the container row 2*a* moving up in the rear row pusher 10 is initially not yet accelerated in the outlet direction AR.

FIG. 5E shows a state where the acceleration belt 21 has already been accelerated to half the outlet speed VA of the outlet conveyor belt 6*a* to accelerate the moved-up container row 2*a* by means of the movement component BK such that each of its containers 2 at the belt transition 23 may reach the outlet speed VA of the outlet conveyor belt 6*a* and is thus received by its rear container path 22*c*.

Here, the containers 2 are guided in the guiding channel 10*c* of the rear row pusher 10 in the outlet direction AR despite the, in this respect, oblique extension of the acceleration belt 21 and the adjacent rear container path 22*c* at the belt transition 23.

FIG. 5F finally shows a state where the acceleration belt 21 has reached the outlet speed VA of the outlet conveyor belt 6*a*.

Accordingly, the timing of the acceleration is adapted such that the container row 2*a* running out of the rear row pusher 10 while accelerating the acceleration belt 21 follows, without time gaps and gaps in the outlet direction AR, the container row 2*a* that has already previously run-out from the front row pusher 9.

FIG. 5F moreover schematically indicates that downstream of the belt transition 23 on the outlet side, deflection rails 24 can be stationarily arranged above the outlet conveyor belt 6*a* to join the container rows 2*a*, following each other without time gaps and gaps in the outlet direction, to a (single-path) container flow aligned in the outlet direction AR.

As FIGS. 6A to 6F illustrate in the schematic plan view onto the buffer surface 3, a container manipulator 13 integrated therein may comprise, for the generation of the movement component BK in a region of the buffer surface 3 between the inlet region 5 and the outlet region 6, at least one grouping belt 25 extending obliquely with respect to the buffer direction PR, and/or one grouping belt 26 extending orthogonally to the buffer direction PR.

Figure 6D:
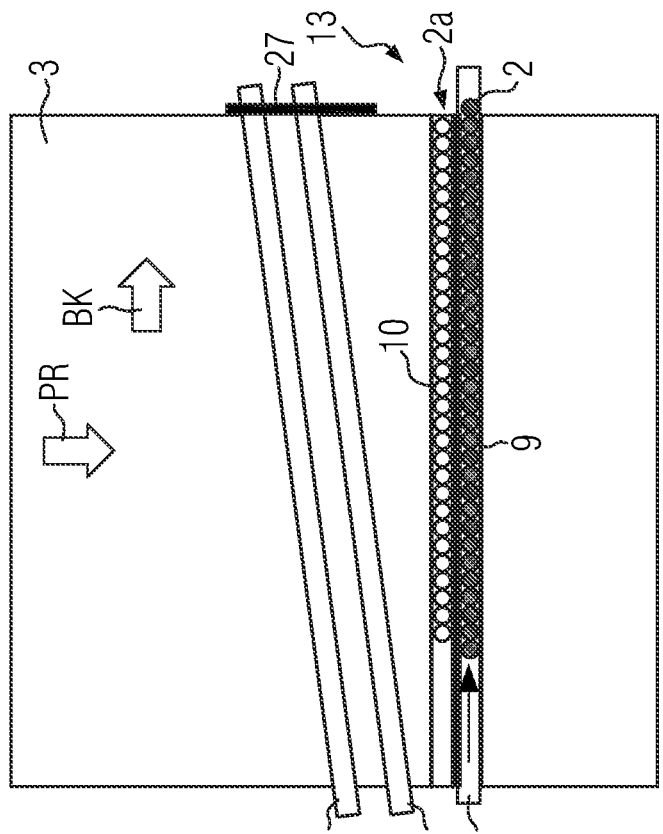
Figure 6C:
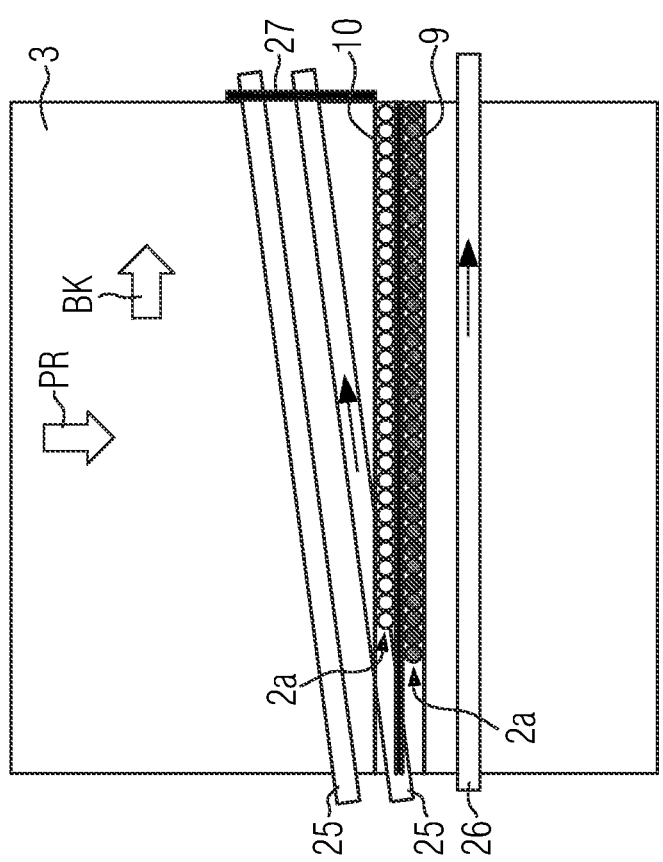

According to FIGS. 6A to 6C, obliquely extending grouping belts 25 may be driven unidirectionally and obliquely against the buffer direction PR towards a stop 27. Thereby, the smaller the distance of the containers to the stop 27 is, the earlier containers 2 are picked up by the respective grouping belt 25 within a row pusher 9, 10 during a feed in the buffer direction PR. Thus, the movement component BK transverse to the buffer direction PR can be applied to the containers 2 of one container row 2*a* one after the other, so that the containers 2 will finally, starting from the stop 27, strike against each other and thereby be shifted against each other without gap. Container rows 2*a* can thus be optionally closed without gap within row pushers 9, 10.

Figure 6F:
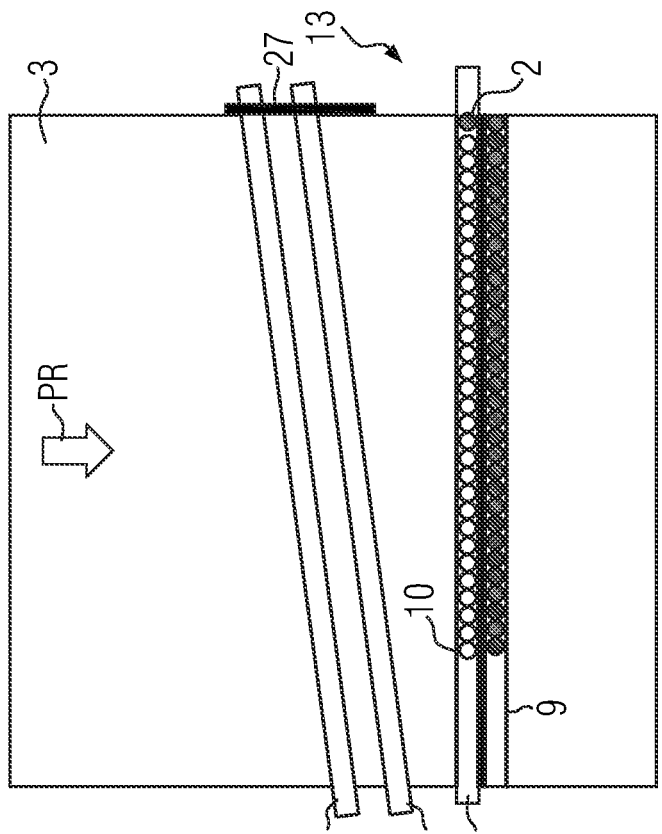
Figure 6E:
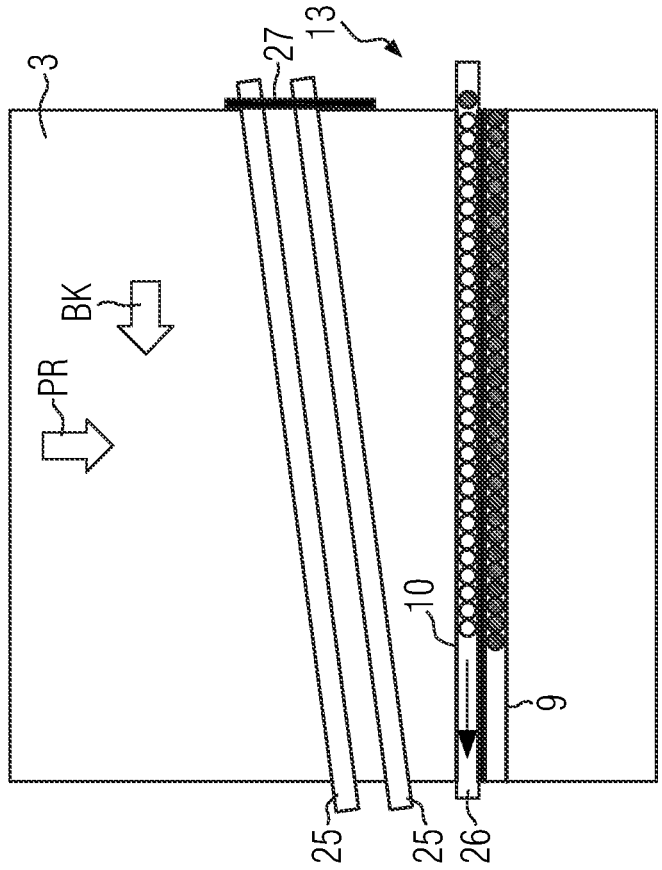

In contrast, the orthogonally arranged grouping belt 26 may be driven bidirectionally and extends laterally beyond the buffer surface 3. As can be seen in FIGS. 6D to 6F, excessive containers 2 of one container row 2*a* can be driven in this manner, for example, out of a front row pusher 9 from the buffer surface 3 and into another row pusher, for example into a rear row pusher 10, to fill missing containers 2 of a container row 2*a*, that means to match the number of containers 2 per buffered container row 2*a* or per row pusher 9, 10.

The moving component BK transverse to the buffer direction PR here changes its direction which is schematically indicated by a corresponding block arrow.

Thus, the container manipulators 11, 12 on the inlet side/the outlet side with deceleration belts 14/acceleration belts 21 are mainly suited for optimising the storage/withdrawal operations, and the container manipulators 13 with grouping belts 25, 26 arranged therebetween are mainly suited for optimising the container distribution within individual container rows 2*a* or else between individual container rows 2*a*.

By the containers 2 being laterally guided in the row guides 9, 10 both in the buffer direction PR and against the buffer direction PR, an acceleration/delay both in and against the inlet direction ER/the outlet direct AR and obliquely thereto result in a movement component BK transverse to the buffer direction PR.

Figure 9:
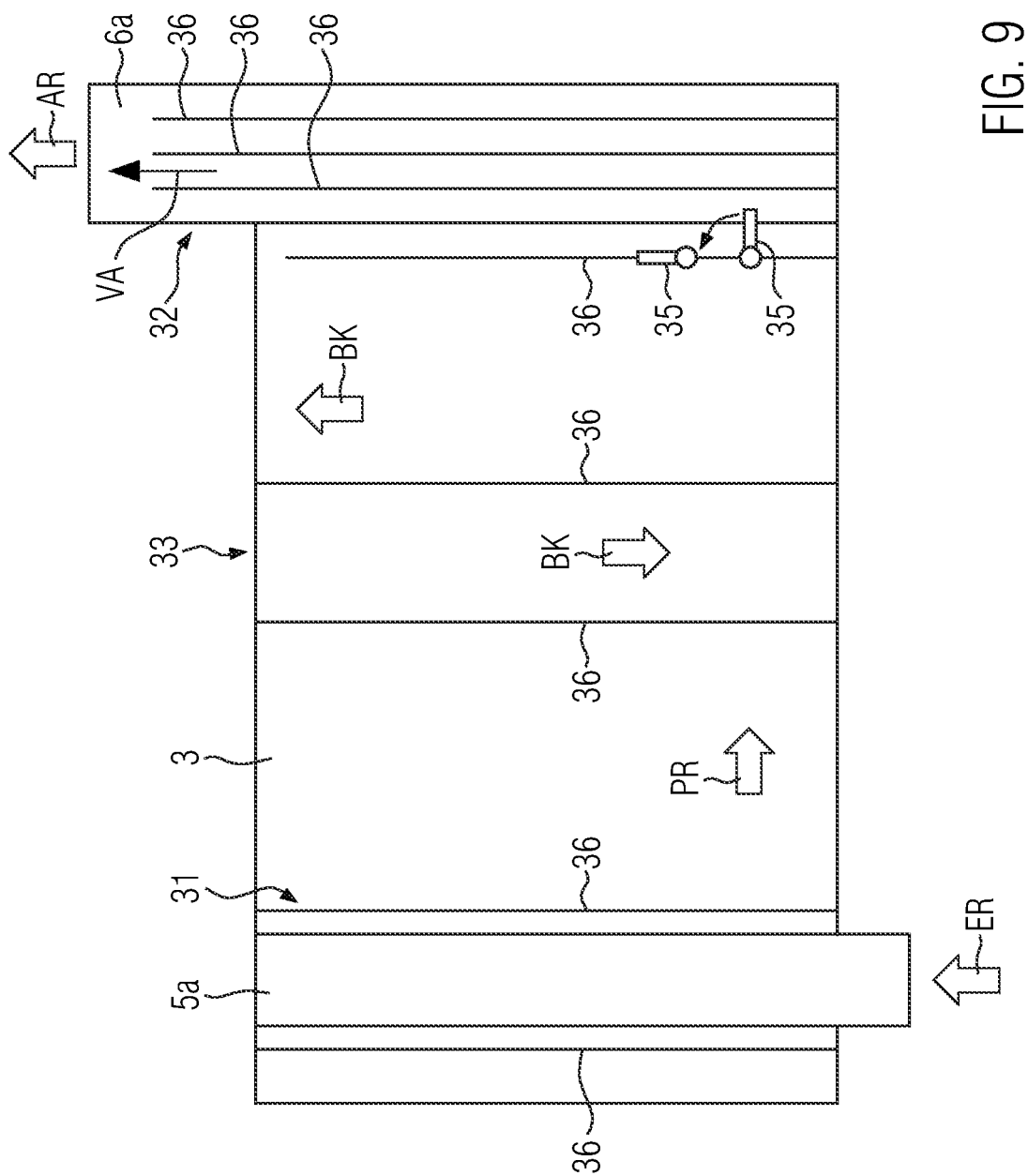
FIG. 9 shows a schematic plan view onto the principal arrangement of the container manipulator according to FIGS. 7 and 8.

In FIGS. 7 to 9, a further embodiment of a container manipulator 31 on the inlet side, a container manipulator 32 on the outlet side, and a container manipulator 33 integrated in the buffer surface 3 therebetween for generating an additional movement component BK transverse to the buffer direction PR is schematically represented.

The container manipulator 31, 32, 33 can accordingly comprise a linear conveyor means 34 extending along the inlet conveyor belt 5*a* and/or the outlet conveyor belt 6*a*, and thus transverse to the buffer direction PR, the conveyor means 34 being arranged underneath the inlet conveyor belt 5*a*, the outlet conveyor belt 6*a*, and the buffer surface 3.

The container manipulator 31, 32, 33 then furthermore comprises catches 35 movable at the conveyor means 34 transverse to the buffer direction PR which can be rotated inwards into the row pushers 9, 10 each about a vertical axis 35*a*. To this end, the catches 35 can comprise catch fingers 35*b* essentially oriented horizontally and swiveling shafts 35*c* essentially oriented vertically.

The catches 35 attached to the conveyor means 34 each project, through a through-slot 36 extending along the inlet conveyor belt 5*a* and/or the outlet conveyor belt 6*a*, and/or transversely within the buffer surface 3, to the top into the region of the row pushers 9, 10.

The linear conveyor means 34 can, for example, be embodied as a linear induction motor with a long stator 34*a* and slides 34*b* individually driven thereby, to which one catch 35 each may be attached. The slides 34*b* can run along at the long stator 34*a* on guide rolls/rollers 34*c* in a principally known manner.

The row pushers 9, 10 then may have horizontally extending through-slots 37 through which the catches 35 can be rotated inwards into the row pushers 9, 10.

As can be seen in FIG. 8, the catches 35 can be individually rotated inwards between individual containers 2 of one container row 2*a*. However, it is also possible to apply the movement component BK extending transversely to the buffer direction PR to a plurality of containers 2 of the container row 2a together by one catch 35 each in the sense of a sub-group. This is schematically indicated in FIG. 8 as also is an orbit 34d of the conveyor means 34 along which the slides 34b can be removed from the region of the buffer surface 3 and the row pushers 9, 10 and subsequently be positioned anew again.

By rotating the catches 35 inwards, the containers 2 can be manipulated individually or in groups transverse to the buffer direction PR. Thus, optionally existing gaps between the containers 2 can be closed, or such gaps can also be generated, if required, to provide a transport partitioning 38 of the containers 2 transverse to the buffer direction PR for the later outlet of the container groups 2a, or to form it from these sub-groups corresponding to an arrangement of the containers 2 within a pack to be produced.

It is also conceivable to generate the movement component BK with a plurality of slides 34b coupled to each other with respect to their drives, wherein the catches 35 then would not have to be necessarily rotated inwards into the row pushers 9, 10 at each slide 34b. For example, the movement component BK could be applied to a sub-group 2c of a plurality of containers 2 by one single catch 35 in order to push the containers 2 together within the row pushers 9, 10 without gaps, and/or to shift them. The driving torque required for this can then be generated by a plurality of slides 34b coupled to each other with respect to their drives.

Such functions can also be realised with a container manipulator 33 integrated in the buffer table 3 between the inlet region 5 and the outlet region 6. In this case, the construction of the container manipulator 33 can be simplified since then, no inlet conveyor belt 5a/outlet conveyor belt 6a is to be taken into consideration in its region.

The principal possibilities of arranging the container manipulators 31, 32, 33 are schematically indicated in FIG. 9. Accordingly, the container manipulator 32 on the outlet side can be used to accelerate the containers 2 to the outlet speed VA of the outlet conveyor belt 6a. Equally, the containers 2 could be accelerated to the conveyor speed of a conveyor belt formed adjacent to the outlet conveyor belt 6a.

As is indicated in this respect in FIG. 9, the through-slots 36 may then be extended into the region of the adjacent conveyor belt/outlet conveyor belt 6a to such an extent that the catches 35 rotated back into the outlet direction AR at the point of return of the linear conveyor means 34 can submerge under the respective transport plane.

With the container manipulators 31, 32, 33, the container rows 2a can be brought to a transport partitioning 38 transverse to the buffer direction PR, be shifted towards each other without gaps and/or be accelerated in the outlet direction AR in order to optimise the withdrawal of the container rows 2a.

Figure 12:
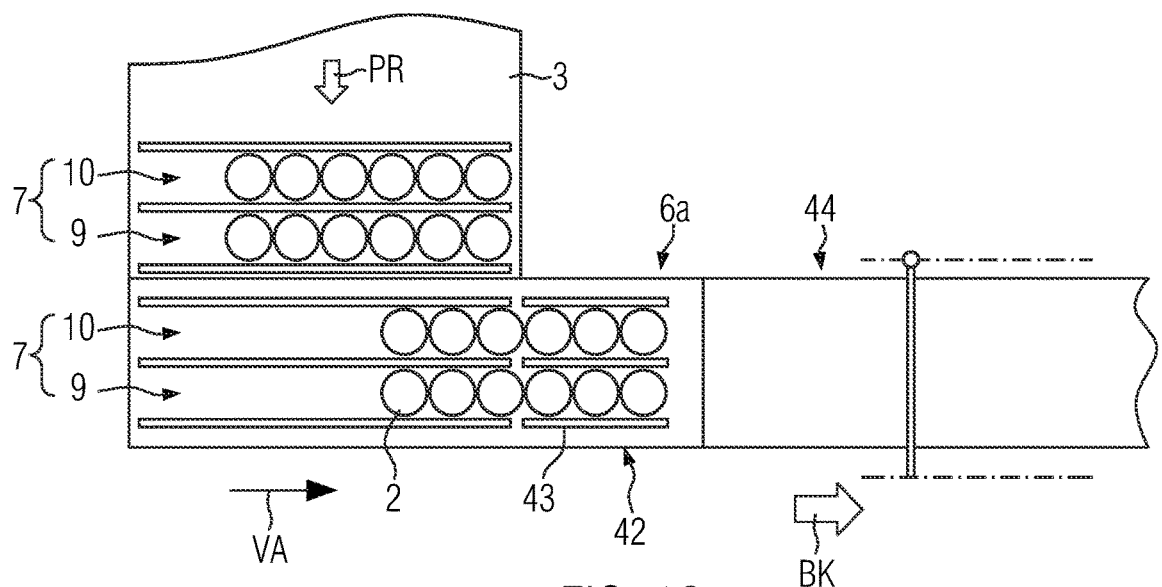
FIG. 12 shows a lateral view of the container manipulator in the region of the outlet conveyor belt.

FIGS. 10 to 12 schematically illustrate a further container manipulator 42 on the outlet side with at least one slide 43 movable in and against the outlet direction AR in an oscillating manner which is designed for retaining/releasing, in a controlled manner, a group 2d formed of the container rows 2a on the outlet side. The groups 2d correspond, for example, to packs to be produced downstream of the device 1. For example, a group 2d consisting of six containers 2 is represented by way of example.

Accordingly, the container manipulator 42 is arranged at the outlet region 6 of the device 1 such that the slide 43 can pick up the containers from the outlet conveyor belt 6a and transfer them to a conveyor section 44 following in the outlet direction AR. This comprises, for example, a conveyor belt 44a and a thrust chain 44b. The conveyor section 44 mat provide the connection to a (non-depicted) packaging machine for the containers 2 arranged downstream and is usually running faster than the outlet conveyor belt 6a.

The slide 43 comprises fixing elements 43a, such as, for example, clamp bars 43b and receiving channels 43c formed therebetween for the containers 2 running out of the row pushers 9, 10. The receiving channels 43c can be narrowed by the clamp bars 43b in such a way that the containers 2 that have run in into the slide 43 are retained and are offset in the outlet direction AR across an interface 45 between the outlet conveyor belt 6a and the adjacent conveyor section 44. Here, they may be accelerated to the conveying speed of the conveyor section 44 by means of the movement component BK transverse to the buffer direction PR.

After the containers 2 have been released in the region of the adjacent conveyor section 44 by correspondingly expanding the receiving channels 43b, the slide 43 can be moved back again into the region of the outlet conveyor belt 6a against the outlet direction AR. This altogether results in an oscillating movement 46 of the slide 43 in and against the outlet direction AR.

The clamp bars 43b can be embodied, for example, as air cushions which can be inflated and relieved again in a controlled manner. However, other fixing elements 43a for retaining the containers 2 at the slide 43 would be conceivable, for example vacuum grippers, gripper cups for the mouth regions of the containers 2, or the like. Moreover, other clamp bars 43b could be arranged at the slides and be moved towards each other in a suited manner to retain the containers 2 on the slide 43 and release them again.

Moreover, a plurality of outlet conveyor belts 6a and slides 43 each associated therewith could be arranged one next to the other in the outlet direction AR to withdraw a corresponding number of groups 2d corresponding to the packs to be produced downstream.

The container manipulator 42 on the outlet side permits to eliminate otherwise required transport belts arranged one next to the other for individual transport lanes and permits a running-in into a packaging machine arranged downstream without any pile-up pressure. Moreover, containers 2 with optionally not rotationally symmetric cross-sections can be comparably easily withdrawn and be flexibly transported on the adjacent transport section 44 with an increased stability. Thereby, the functional reliability can be increased and a damage of the containers due to a pile-up pressure can be avoided.

Figure 13:
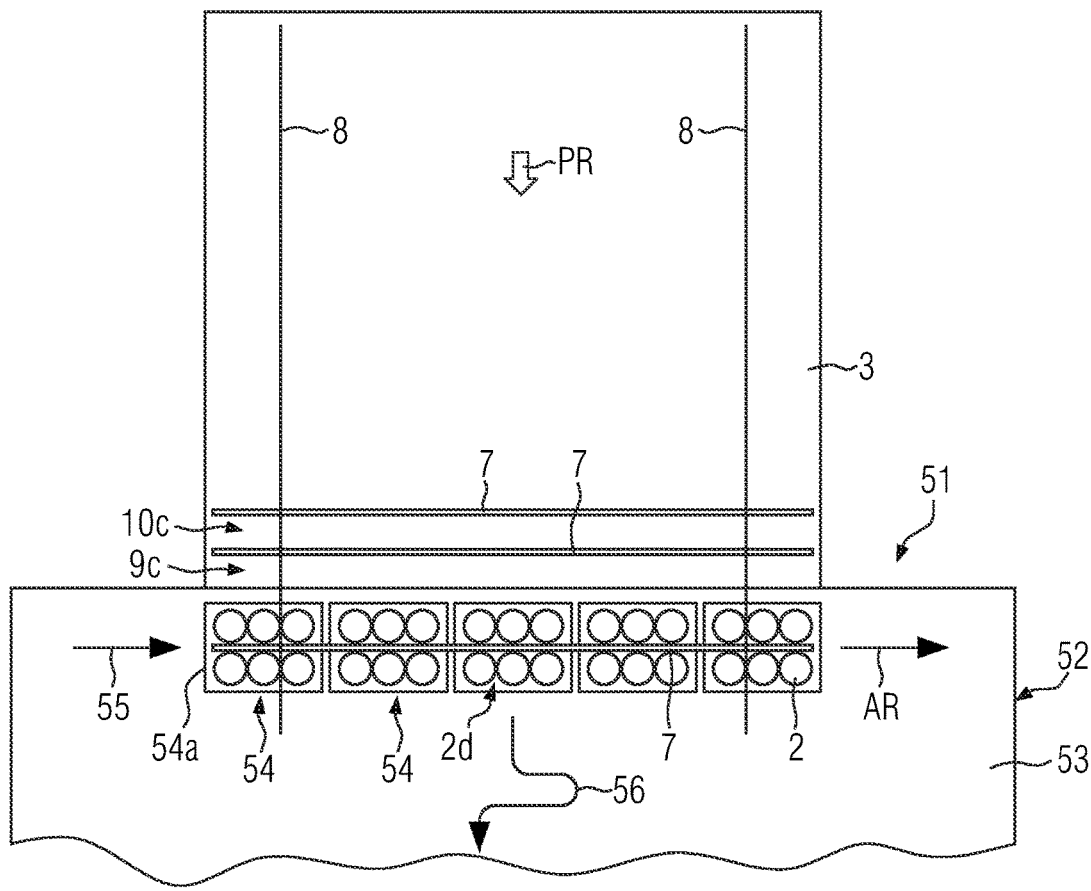
FIG. 13 shows a schematic plan view onto an alternative outlet region with a planar motor system.

FIG. 13 schematically shows an alternative outlet region 51 in which a planar motor system 52 follows the buffer surface 3 in the buffer direction PR.

The planar motor system 52 comprises an active drive surface 53, consisting of planar tiles or the like, and planar motor armatures 54 driven by the drive surface 53 in a planar manner, i.e. two-dimensionally. Such planar motor systems 52 permit a jerk-free and contactless movement of the free-floating planar motor armatures 54 on the drive surface 53 in which, for this purpose, travelling magnetic fields are generated in a manner known per se.

The individual planar motor armatures 54 can accordingly be approached to the buffer surface 3, may be in a travel direction 55 extending transversely to the buffer direction 3. The planar motor armatures 54 furthermore comprise loading surfaces 54a, which are at least approximately aligned with the buffer surface 3, so that the container rows 2a can be shifted onto the loading surfaces 54a of the planar motor armatures 54 by the row pushers 9, 10.

The planar motor armatures 54 loaded with the container rows 2a in this way may then be driven away in the outlet direction AR, that means transversely the buffer direction PR and into the travel direction 55. In this case, the row pushers 9, 10 can stationarily wait for being emptied in the outlet region 51, that means above the planar motor system 52.

As an alternative, it would be conceivable to lift the row pushers 9, 10, after the containers 2 have been pushed over onto the planar motor armature 54, up from the containers 2 to such an extent that these are completely released by the row pushers 9, 10, and the loaded planar motor armatures 54 can be moved away from the buffer surface 3 in the buffer direction PR, that means transverse with respect to the guiding channels 9c, 10c of the row pushers 9, 10.

The planar motor armatures 54 can subsequently be independently moved, for example along curves 56, in order to distribute the containers 2, for example, in groups 2d, in a suited manner for further processing, for example for packaging them.

In principle, it would also be conceivable to combine the outlet region 6 with at least one outlet conveyor belt 6a and the outlet region 51 with a planar motor system 52 adjacent in the buffer direction PR. For example, the outlet conveyor belt 6a and the planar motor armatures 54 of the planar motor system 52 could be used depending on certain goods to be filled and/or container formats alternatingly and/or in combination for withdrawing the containers 2.

Moreover, it is noted that in one or more examples, it is possible that the system disclosed herein incudes a controller, wherein the controller comprises instructions stored in non-transitory memory for actuating the various conveyor belts, planar motor armatures, and row pushers described herein. In at least one example, the controller may comprise instructions stored in non-transitory memory for carrying out the example methods described herein. That is, the controller may include instructions for actuating the various conveyor belts, planar motor armatures, and row pushers in accordance with the example methods described herein.

The invention claimed is:

1. A method for buffering containers in a container treatment plant, wherein the containers are stored in single rows by means of at least one inlet conveyor belt in an inlet direction, are shifted in single rows onto a buffer surface by shuttles with row pushers guided on rails and driven individually into a buffer direction extending transversely to the inlet direction, and are withdrawn by means of at least one outlet conveyor belt adjacent to the buffer surface in the buffer direction into an outlet direction extending transversely to the buffer direction, or by means of at least one planar motor armature that can be driven towards the buffer surface adjacent to the at least one planar motor armature in the buffer direction, wherein the containers are moved in a controlled manner transversely to the buffer direction during a storage and/or withdrawal operation, and are thereby decelerated or accelerated with respect to the inlet conveyor belt/outlet conveyor belt,
wherein the containers are grouped into container rows while they are each running in into an associated row pusher on a slowing-down deceleration belt, from an inlet speed of the inlet conveyor belt in particular to a standstill, wherein the row pusher pushes the respective container row from the inlet conveyor belt over the deceleration belt into the buffer direction, and wherein the deceleration belt is subsequently accelerated again.

2. The method according to claim 1, wherein the containers running in on the inlet conveyor belt are deflected against the buffer direction into inlet positions which are aligned with a feed position of the associated row pusher at a time of a running-in of the respective container into the row pusher.

3. The method according to claim 2, wherein the containers are deflected by means of a deflection rail which is initially extended obliquely with respect to the inlet direction and is moving, in the process, with its free end along with the respective foremost container of the respective container row at the inlet speed, which is stopped when the inlet position of the foremost container is reached, and which is retracted again corresponding to the running-in positions of the respective following containers of the container row.

4. The method according to claim 1, wherein between consecutive container rows, a minimum distance of at least 80% of a diameter of the containers is maintained in the buffer direction in a region of the deceleration belt.

5. The method according to claim 1, wherein the containers run within the row pushers from the inlet conveyor belt to the deceleration belt over a belt transition extending obliquely with respect to the inlet direction.

6. The method according to claim 1, wherein a leading container row within the associated row pusher is pushed onto the outlet conveyor belt into the buffer direction over an acceleration belt, and wherein a directly following container row within the associated row pusher is pushed onto the acceleration belt decelerated and, is successively accelerated to the outlet speed and guided onto the outlet conveyor belt, so that the container rows follow each other there without gaps in the outlet direction.

7. The method according to claim 6, wherein the following container row within the associated row pusher runs from the acceleration belt onto the outlet conveyor belt over the belt transition extending obliquely to the outlet direction.

8. The method according to claim 1, wherein the containers are pushed against each other within the row pushers by at least one grouping belt integrated in the buffer surface and extending transversely to the buffer direction, and/or are driven out of leading row pushers next to the buffer surface and from there again back into respective following row pushers.

9. The method according to claim 1, wherein catches guided underneath the inlet conveyor belt and/or the outlet conveyor belt and/or the buffer surface are, driven by a motor, rotated inwards, through through-slots extending transversely to the buffer direction at the row pushers, into the row pushers and between containers therein adjacent transverse to the buffer direction, and the catches are then moved along the through-slots driven by a motor, whereby a transport partitioning of the containers is produced transverse to the buffer direction, and/or the containers are grouped and/or the containers are accelerated for a transfer to the outlet conveyor belt.

10. The method according to claim 1, wherein for the withdrawal, slides with fixing elements for a controlled retaining/release of a group of containers running out of the row pushers are moved between the outlet conveyor belt and a conveyor section following the outlet conveyor belt in the outlet direction in/against the outlet direction in an oscillating manner.

11. The method according to claim 4, wherein the planar motor armatures drive into the region of the row pushers in a travel direction transverse to the buffer direction, the row pushers shift the containers from the buffer surface onto loading surfaces of the planar motor armatures waiting there, and these move the containers away from the buffer surface.

12. The method according to claim 1, wherein the row pushers receive the containers in single rows separated from each other in guiding channels extending transversely to the buffer direction and limited both in and against the buffer direction.

13. A device for buffering containers grouped in single rows in a container treatment plant comprising a buffer surface and a transport system arranged above it for shifting the containers on the buffer surface into a buffer direction from an inlet region with at least one inlet conveyor belt extending transversely to the buffer direction into an outlet region with at least one outlet conveyor belt following the buffer surface in the buffer direction and driven transversely thereto, or with at least one planar motor armature that can be approached adjacent to the buffer surface in the buffer direction, wherein the transport system comprises shuttles guided on rails and driven independently with row pushers for shifting the containers grouped in single rows, wherein at least one container manipulator arranged in/at the inlet region and/or outlet region and driven intermittently, for accelerating and/or decelerating the containers transverse to the buffer direction and relative to the inlet conveyor belt/outlet conveyor belt, wherein the inlet conveyor belt comprises a plurality of container paths arranged one next to the other, and the container manipulator is a single-path deceleration belt which is adjacent, underneath the row pushers at a belt transition extending obliquely to the inlet direction, to a front container path of the inlet conveyor belt, seen in the buffer direction, transversely to the buffer direction, wherein the inlet conveyor belt can be continuously driven at a predetermined inlet speed, and wherein the deceleration belt can be decelerated and accelerated to and from the inlet speed depending on feed positions of individual row pushers.

14. The device according to claim 13, further having a deflection rail which is extended transverse to the inlet direction and synchronously moved along with a container at the inlet speed, is stopped, after an extension to a given offset against the buffer direction, and can retract the offset again synchronously with a feed of an associated row pusher in a reducing manner.

15. The device according to claim 13, wherein the outlet conveyor belt comprises a plurality of container paths arranged one next to the other, and the container manipulator is adjacent, underneath the row pushers at the belt transition extending obliquely to the outlet direction, to a rear container path of the outlet conveyor belt, seen in the buffer direction, transversely to the buffer direction, wherein the outlet conveyor belt can be continuously driven at a predetermined outlet speed, and wherein the acceleration belt can be accelerated depending on feed positions of individual row pushers.

16. The device according to claim 13, further having a container manipulator integrated in the buffer surface, comprising: at least one grouping belt extending transversely to the buffer direction and driven intermittently in the direction towards the end of the row pushers for pushing containers against each other in single rows within individual row pushers.

17. The device according to claim 16, further having a container manipulator integrated in the buffer surface, comprising: at least one grouping belt extending transversely to the buffer direction which is driven intermittently and bidirectionally for exchanging containers between individual row pushers and extends beyond the end of the row pushers.

18. The device according to claim 15, wherein the container manipulator comprises: a conveying means extending underneath the inlet conveyor belt and/or the outlet conveyor belt transversely to the buffer direction; and catches fixed thereto and projecting beyond the inlet conveyor belt/outlet conveyor belt which can be rotated inwards, driven by a motor, through through-slots embodied in the row pushers, into the row pushers between the containers to shift them transversely to the buffer direction by driving the conveyor means.

19. The device according to claim 18, wherein the conveying means is embodied for intermittently accelerating and/or decelerating the catches between a standstill and the inlet speed and/or the outlet speed.

20. The device according to claim 13, further having a container manipulator integrated in the buffer surface between the inlet region and the outlet region, comprising: a conveying means extending underneath the buffer surface transverse to the buffer direction; and catches fixed thereto and projecting beyond the buffer surface which can be rotated inwards, driven by a motor, through through-slots embodied in the row pushers, into the row pushers between the containers to shift them transversely to the buffer direction by driving the conveying means.

21. The device according to claim 15, wherein the container manipulator comprises: a slide with fixing elements movable in and against the outlet direction above the outlet conveyor belt in an oscillating manner for retaining, in a controlled manner, a group of containers running out of the row pushers, and for releasing, in a controlled manner, the containers in the region of a conveyor section adjacent to the outlet conveyor belt in the outlet direction.

* * * * *